(12) United States Patent
Anderson et al.

(10) Patent No.: US 9,958,307 B1
(45) Date of Patent: May 1, 2018

(54) CHEMICAL DOSING SYSTEM

(71) Applicant: Anderson Chemical Company, Litchfield, MN (US)

(72) Inventors: Leif Anderson, Litchfield, MN (US); Jim Alsleben, Litchfield, MN (US); Jamie Brekke, Dassel, MN (US); Alex Carlson, Litchfield, MN (US); Kurt Regenbrecht, Hallettsville, TX (US)

(73) Assignee: Anderson Chemical Company, Litchfield, MN (US)

( * ) Notice: Subject to any disclaimer, the term of this patent is extended or adjusted under 35 U.S.C. 154(b) by 15 days.

(21) Appl. No.: 15/143,106

(22) Filed: Apr. 29, 2016

Related U.S. Application Data

(60) Provisional application No. 62/277,386, filed on Jan. 11, 2016.

(51) Int. Cl.
| | |
|---|---|
| *G01F 11/28* | (2006.01) |
| *G01F 11/44* | (2006.01) |
| *G01F 15/00* | (2006.01) |
| *B67C 11/04* | (2006.01) |
| *B08B 3/08* | (2006.01) |

(52) U.S. Cl.
CPC ............ *G01F 11/44* (2013.01); *B08B 3/08* (2013.01); *B67C 11/04* (2013.01); *G01F 15/005* (2013.01)

(58) Field of Classification Search
CPC . B08B 3/08; B67C 11/04; G01F 11/44; G01F 15/005; G01F 11/22
See application file for complete search history.

(56) References Cited

U.S. PATENT DOCUMENTS

| 1,073,528 | A | * | 9/1913 | Schaab | ............... B67C 11/04 |
| | | | | | 141/344 |
| 1,541,245 | A | | 1/1924 | Bomfreund | |
| 2,104,332 | A | | 1/1938 | Rohde | |
| 2,127,465 | A | | 8/1938 | Church | |
| 2,424,675 | A | | 7/1947 | Wood | |
| 2,575,967 | A | | 11/1951 | May | |

(Continued)

FOREIGN PATENT DOCUMENTS

| DE | 4123242 A1 | 1/1992 |
| JP | 5566431 A | 5/1980 |

*Primary Examiner* — Nicholas J Weiss
*Assistant Examiner* — Bob Zadeh
(74) *Attorney, Agent, or Firm* — Moss & Barnett; Glen E. Schumann

(57) ABSTRACT

A liquid dosing device for use with a liquid dispenser that includes a container for holding liquid in communication with a dispenser base, an outlet port for dispensing the liquid. The liquid dosing device includes a valve housing, a reservoir and a dosing cup. The valve housing is mounted to the dispenser base and includes an open top, an outlet port and a blocking region. The reservoir is mounted within the valve housing and includes at least one inlet port in communication with the dispenser base outlet port and at least one outlet port. The dosing cup is movably mounted within the valve housing in fluid communication with the reservoir and includes at least one inlet port in fluid communication with the reservoir outlet port, a blocking region, at least one outlet port and mechanism for moving the dosing cup between a fill position and a dose position to prevent spillage of the liquid being dispensed, or to dispense the liquid in defined quantities.

18 Claims, 39 Drawing Sheets

(56) References Cited

U.S. PATENT DOCUMENTS

| | | | |
|---|---|---|---|
| 3,283,956 A | 11/1966 | Craswell | |
| 3,387,748 A | 6/1968 | Brenchley | |
| 4,058,240 A | 11/1977 | Becker | |
| 4,828,145 A | 5/1989 | Raufast | |
| 4,860,930 A | 8/1989 | Tu | |
| 5,255,829 A | 10/1993 | Trumstedt | |
| 5,547,110 A | 8/1996 | Keller | |
| 5,823,401 A | 10/1998 | Zgoda | |
| 5,850,946 A | 12/1998 | Keller | |
| 6,059,148 A | 5/2000 | Keller | |
| 6,283,339 B1* | 9/2001 | Morrow | G01F 23/24 222/142.9 |
| 6,338,423 B1 | 1/2002 | Polon | |
| 6,550,640 B2* | 4/2003 | Smith | G01F 11/22 222/1 |
| 6,766,924 B1 | 7/2004 | Ophardt | |
| 7,658,213 B1 | 2/2010 | Anderson | |
| 8,863,996 B2 | 10/2014 | Mishra | |
| 2007/0186995 A1* | 8/2007 | Steinweg | B67C 11/04 141/338 |
| 2007/0295753 A1* | 12/2007 | Vangeel | A47K 5/1207 222/163 |
| 2010/0043785 A1 | 2/2010 | Rasmussen | |
| 2010/0206408 A1* | 8/2010 | Krohn | B67C 11/04 137/602 |
| 2011/0101023 A1* | 5/2011 | Chan | G01F 11/20 222/1 |
| 2011/0194905 A1 | 8/2011 | Murayama | |
| 2013/0000775 A1* | 1/2013 | Jameson | B67C 11/04 141/11 |
| 2013/0042934 A1* | 2/2013 | Endt | G01F 15/005 137/560 |
| 2013/0119093 A1* | 5/2013 | Thomson | B67C 11/04 222/560 |
| 2013/0320046 A1 | 12/2013 | Aviram | |
| 2015/0071802 A1 | 3/2015 | Goldbrunner et al. | |
| 2015/0083758 A1* | 3/2015 | Ismail | B67D 7/22 222/434 |
| 2015/0090738 A1 | 4/2015 | Caporale | |
| 2015/0108170 A1 | 4/2015 | Li | |
| 2015/0108174 A1 | 4/2015 | Py | |

\* cited by examiner

FIG. 5 of Morrow patent

FIG.6 of Smith patent

CHEMICAL DOSING SYSTEM

CROSS REFERENCE TO RELATED APPLICATION

This application claims priority to U.S. Provisional Application 62/277,386 filed on Jan. 11, 2016, which is hereby incorporated by reference in its entirety.

FIELD OF INVENTION

The present invention relates to liquid dispensers and particularly, to dispensers of liquid chemical in measured quantities.

BACKGROUND OF THE INVENTION

Various types of dispensers are disclosed in the prior art. U.S. Pat. Nos. 7,748,579, 5,495,962, 5,772,086 and 6,283,339 disclose particulate dispensers. These dispensers are not appropriate for dispensing liquids because they lack proper seals to prevent potentially harmful liquid chemicals from leaking from the dispenser, but may have some relevance.

U.S. Pat. No. 6,283,339 issued to Morrow discloses a dispenser for use with particulate. Referring to FIG. 5 of the Morrow patent, attached as FIG. 1 to this application, Morrow discloses a twist bottom two-part dispenser 30 and 22 for attachment to the bottom of a cylindrical container 12 holding a powdered or granular product. Open-faced chambered member 30 forms two or more chambers of different volume is contained inside open-faced cup-shaped member 20 and physically attached thereto. Disk 50 closes off the bottom of the chambered member. The particle product is contained inside container 12.

When a user twists the chambered member with respect to the cup-shaped member to cause inlet holes 34 and 35 in the top face of chambered member 30 to align with inlet holes 24 and 25 in cup-shaped member 20, the particle product will flow by means of gravity from the container 12 into both of the chambers formed in the chambered member. When the chambered member 30 is then twisted again by the user with respect to the cup-shaped member so that outlet hole 36 or 37 formed in the side wall of chambered member 30 aligns with outlet hole 26 formed in the side wall of cup-shaped member 20, then the particle product can be discharged from the chamber associated with that outlet hole 36 or 37. The volume of the chamber represents a measured dose of the particle product.

Other prior art dispensers claim to be useful for particulate and liquid. U.S. Pat. No. 6,550,640 issued to Smith is one such patent. As shown in FIG. 6 of the Smith patent (FIG. 2 of this Application), the Smith Patent is directed to a container top for dispensing powered and liquid product like a spice from a spice container. The container top contains a metering drum 22 having three chambers 34, 36, and 38 of different volumes. A proximal control disk 23 is attached to one end of the metering drum having three openings 35 that correspond to the chambers. A distal control disk 43 with an opening is affixed to the bottom of control spout 26. The assembly is screwed into engagement with the top of a spice container.

In operation, the user turns the metering drum with respect to the container in the upright position until the hole in the proximal control disk aligns with a hole in the cap 24 of the container. Upon inverting the container, the spice powder flows from the container into the preselected chamber of the metering drum until its volume is filled to produce a measured dose of the spice. The metering drum is then twisted back to a blank position on the proximal control disk. If the top is twisted until the hole in the distal control disk aligns with the chamber filled with the spice, the spice will flow out of the chamber and through the spout 26 for use.

U.S. Pat. Nos. 5,823,401 and 8,517,228 are examples of dispensers that may be used to dispense either liquid or particulate.

A product sold by Applicant under the trademark Sur-Flex™ is another example of a liquid dispenser. The Sur-Flex™ dispenser utilizes multiple valves to control the flow of liquid between a liquid container and various vertically aligned chambers. Multiple seal discs are mounted on a single stem to mate with corresponding seal rings. When the stem is vertically raised, at least one valve opens to allow fluid to flow from the raised liquid container into a reservoir positioned below; when the stem is moved downward, the open valve closes and at least one previously closed valve opens to prevent fluid flow from the container while permitting fluid to be dispensed from the reservoir. However, the SurFlex™ dispenser has some shortcomings in that it fails to provide adequate air flow through the system as fluid flows from the container, through and out the reservoir. Such fluid flow creates a vacuum effect and without sufficient air to take the place of the fluid, it causes the Surflex™ system to dispense fluid slower than desired.

Other than the Surflex™ system, none of the systems referenced above provide an adequate system for dispensing liquid chemical, which can be hazardous to the touch. Thus, there remains a need for a liquid dispenser, and liquid chemical dispenser in particular, that is safe to use and can easily and repeatedly provide measured quantities of liquid chemical quickly on demand.

SUMMARY OF INVENTION

The dosing device of the present invention is designed to dispense a specific amount of liquid, with an emphasis on liquid chemical for various cleaning applications.

The dosing device of the present invention is designed to be used with a fluid dispensing system that includes a dispenser base and a throated liquid container. The dispenser base is attachable to a wall or other surface and includes an inlet port with a hollow probe and an outlet port. The throated container is designed to hold liquid and includes a spring-biased reciprocating valve assembly inserted into the throat of a container to control the flow of liquid from the container. Normally, the reciprocating valve assembly is in it closed position to prevent the liquid from splashing or escaping from the container during handling or storage. But, when the container is inverted and positioned over and onto the hollow probe on the dispenser base, the hollow probe pushes the valve to its open position to allow the chemical to flow out of the container into the dispenser base and through the outlet port.

In one embodiment, the dosing device of the present invention includes a valve housing, reservoir and dosing cup. The valve housing is mounted to the dispenser base and includes an open top, an elongated slot in a side of the housing, an outlet port and a blocking region. The reservoir is mounted within the valve housing and includes at least one inlet port in selective fluid communication with the dispenser base outlet port and at least one outlet port. The dosing cup is generally cylindrical and is rotatably mounted within the valve housing. The dosing cup has at least one inlet port in selective fluid communication with the reservoir outlet port and a blocking region, at least one outlet port and a dosing lever attached to a side of the dosing cup and extending through the elongated slot in the side of the valve housing for rotating the dosing cup between a "fill" position to receive liquid and a "dose" position. When the dosing cup is rotated to the fill position, the reservoir outlet port and the dosing cup inlet port align to permit liquid to flow from the reservoir into the dosing cup and the outlet port of the dosing cup and the blocking region of the valve housing align to prevent the fluid in the dosing cup from flowing out of the dosing cup. When the dosing cup is rotated to the dose position, the reservoir outlet port and the dosing cup blocking region align to prevent liquid from flowing from the reservoir into the dosing cup and the outlet port of the dosing cup and the outlet port of the valve housing align to permit the fluid in the dosing cup to flowing out of the dosing cup and valve housing. The fluid travels throughout the dosing device by means of gravity. A funnel may also be mounted to the bottom of the valve housing to better control the flow of the fluid from the valve housing.

The valve assembly of Anderson Chemical's chemical dosing device provides an effective means for quickly and safely delivering a measured dose of the chemical from the container to an external container.

BRIEF DESCRIPTION OF THE DRAWINGS

Referring now to the drawings, wherein like reference numerals indicate corresponding structure through the several views.

DETAILED DESCRIPTION OF THE INVENTION

Figure 1:
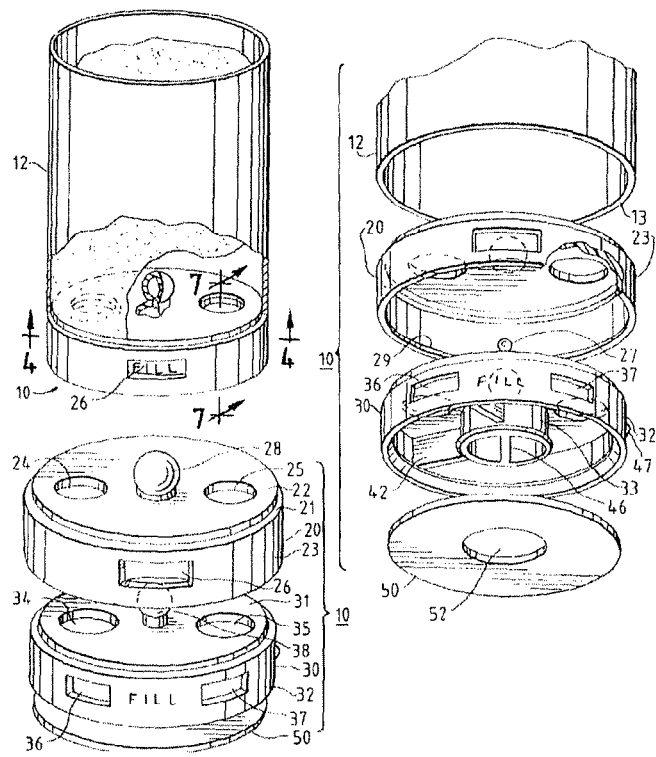
FIG. 1 is FIG. 5 of the Morrow U.S. Pat. No. 6,283,339
Figure 2:
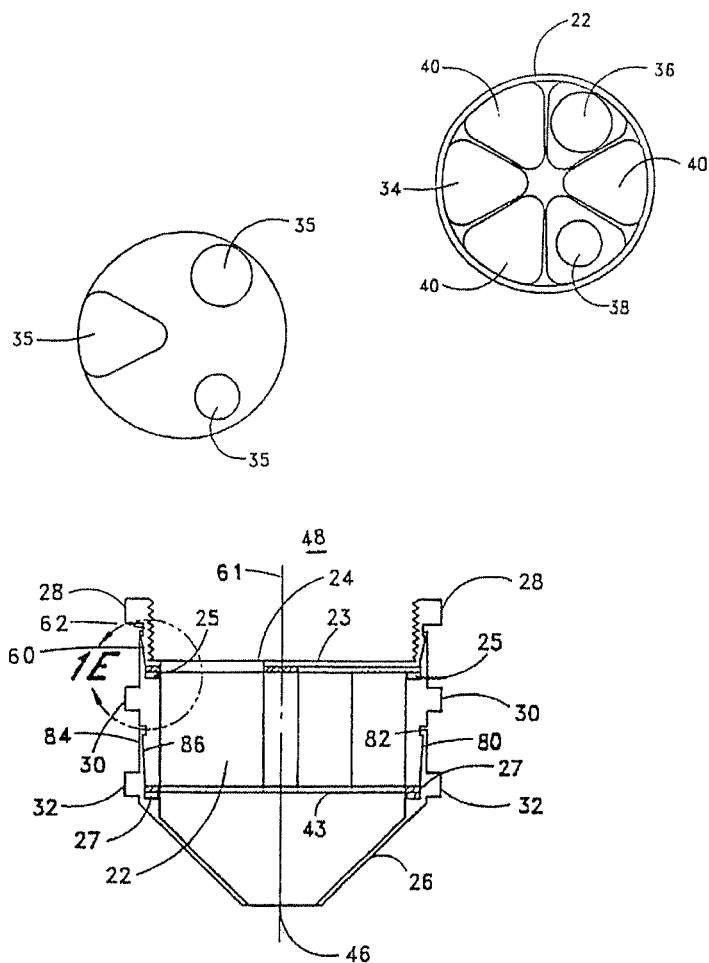
FIG. 2 is FIG. 6 of the Smith U.S. Pat. No. 6,550,640.
Figure 3:
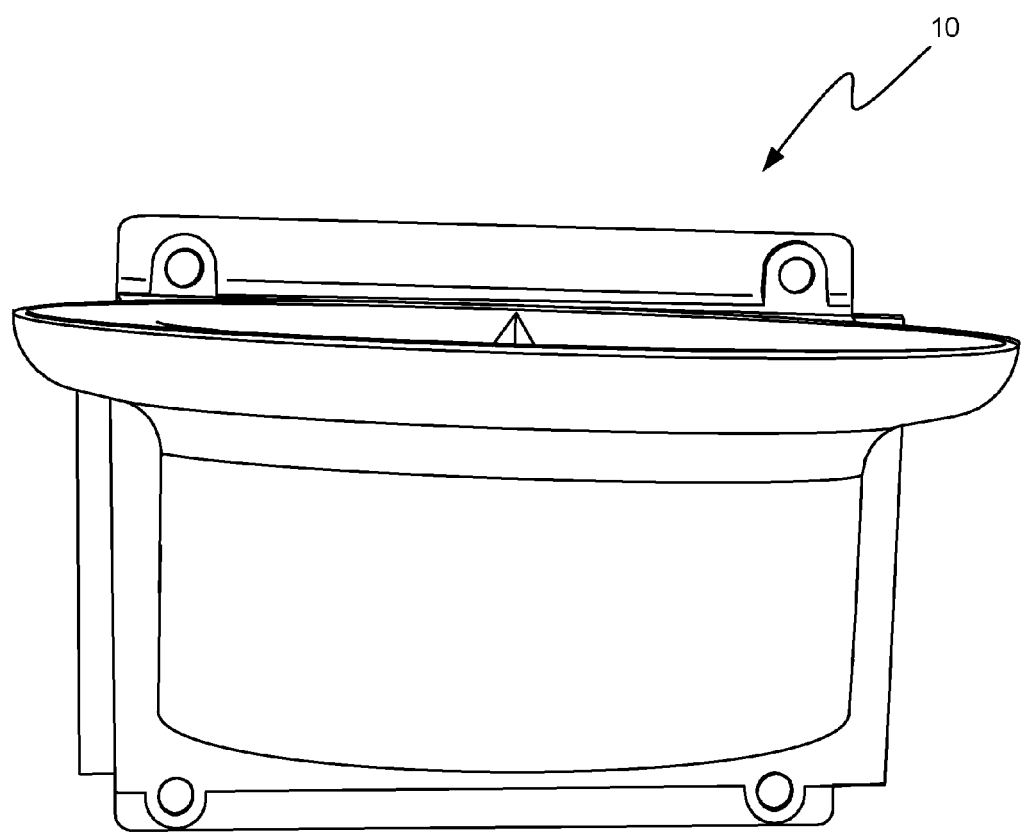
FIG. 3 is a front view of the dispenser base.
Figure 3A:
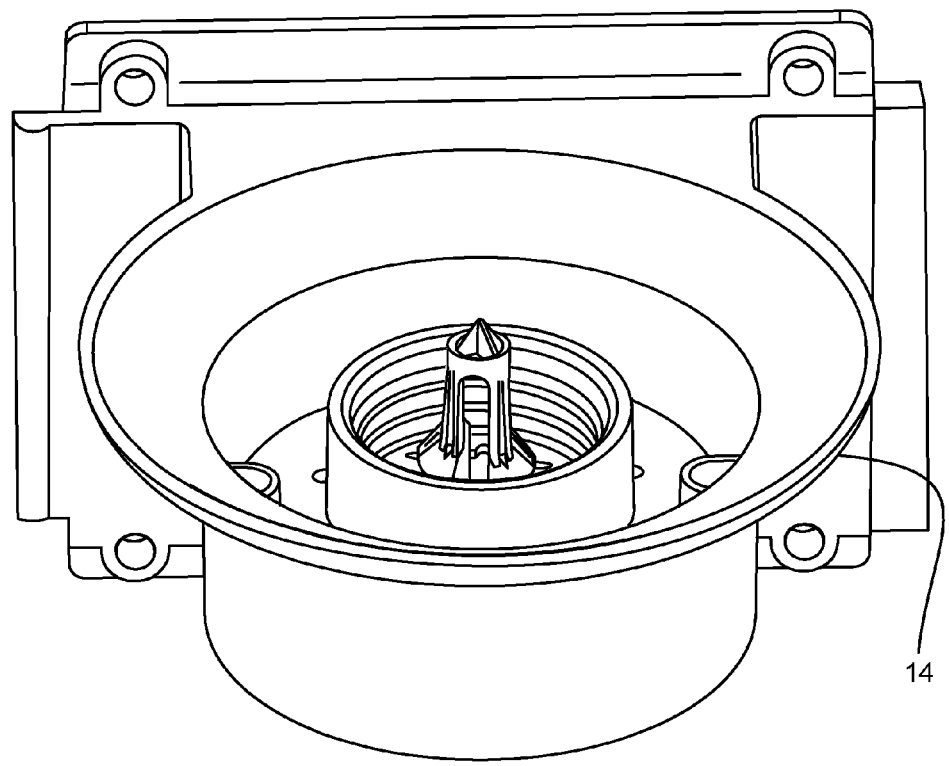
FIG. 3A is a perspective view of the dispenser base.
Figure 3B:
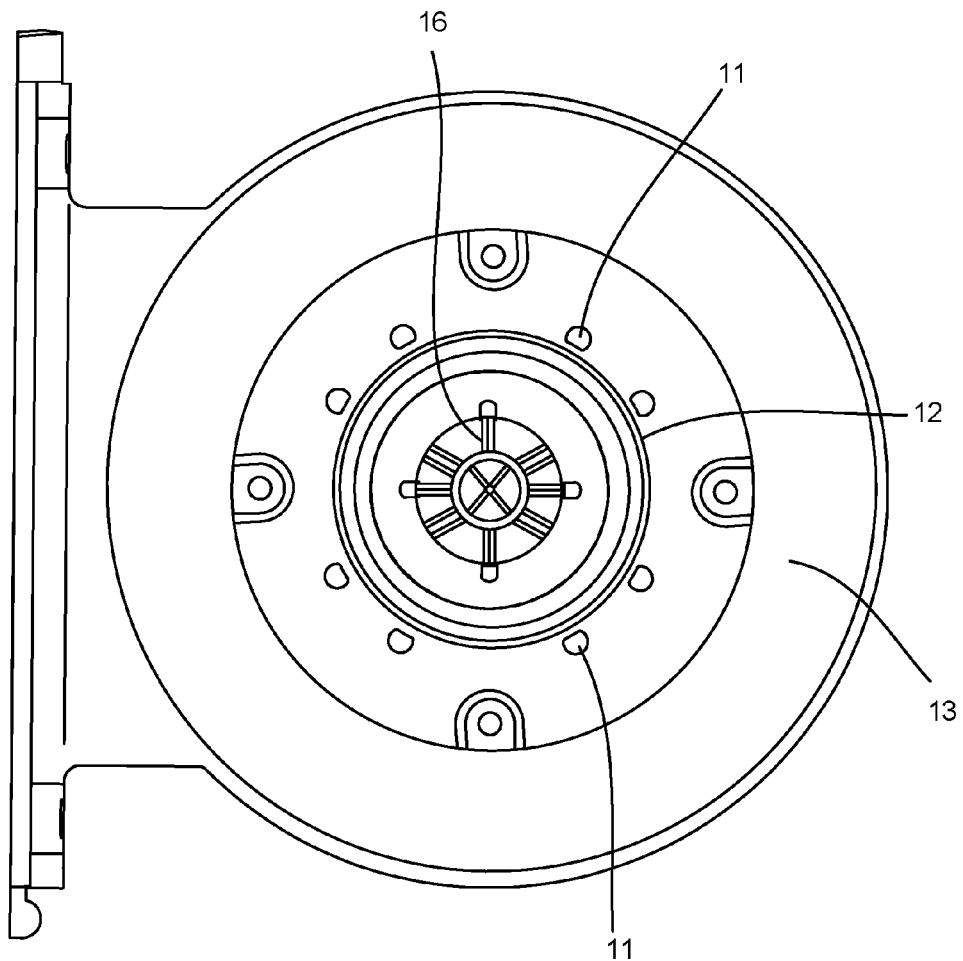
FIG. 3B is a top view of the dispenser base.
Figure 4:
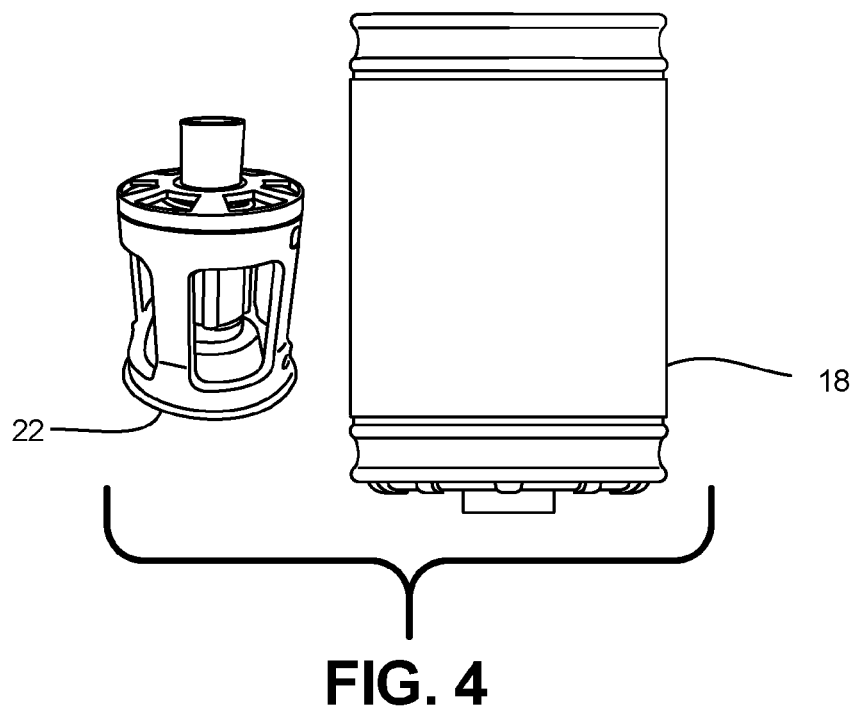
FIG. 4 is a perspective view of one preferred embodiment of the insert valve and a front view of a chemical container of the present invention.
Figure 4A:
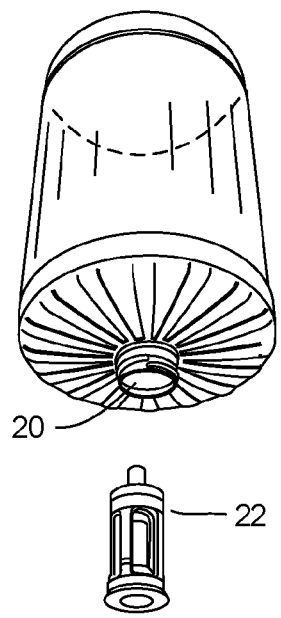
FIG. 4A is a perspective view of a drawing of a preferred embodiment of a chemical container and valve of the present invention.

For a thorough understanding of the present disclosure, refer to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The dosing device of the present system is designed to dispense liquids with an emphasis on liquid chemical. In order to prevent potentially harmful liquid chemical from escaping the dosing device, the dosing device comes with a unique seal arrangement between the various components of the dosing device. The dosing device also includes a unique air flow arrangement to ensure rapid dispensing of liquid.

The dosing device of the present invention is designed for use with a fluid dispensing system similar to that shown in FIGS. 3, 3A, 3B, 3C, 4 and 4A. The fluid dispensing system includes a dispenser base 10 and a liquid container 18.

The dispenser base 10 is attachable to a wall or other surface and includes on a top end, an inlet port 12 with a hollow probe 16 and a shallow cup 13 to support the container. The inlet port may be threaded to engage a threaded neck of a container.

Air holes 11 extend though the dispenser base to permit air to enter the dosing device to allow the liquid to move quickly through the dosing device chambers.

On the bottom side of the dispenser base is an outlet port 19.

The liquid container has a throat 20, which, in one embodiment, is defined by a threaded neck. The throated container 18 is designed to hold liquid, and in one embodiment, liquid chemical.

The container further includes a spring-biased reciprocating valve assembly 22 inserted into the throat of a container to control the flow of liquid from the container. Normally, the reciprocating valve assembly 22 is in a closed position to prevent the liquid from splashing or escaping from the container during handling or storage. But, when the container 18 is inverted and positioned over and onto the hollow probe 16 on the dispenser base, the hollow probe 16 pushes the valve to its open position to allow the liquid to flow out of the container into the dispenser base inlet port 12 and through the outlet port 19.

In the embodiment shown in FIGS. 3, 3A, 3B, 3C, 4 and 4A, the threaded neck of the container screws into a threaded inlet port and the container is further supported by a shallow cup or annular ring 13, however, other embodiments known in the art for securing the container in sealed relation to the mounting bracket are anticipated by the present invention.

Figure 5:
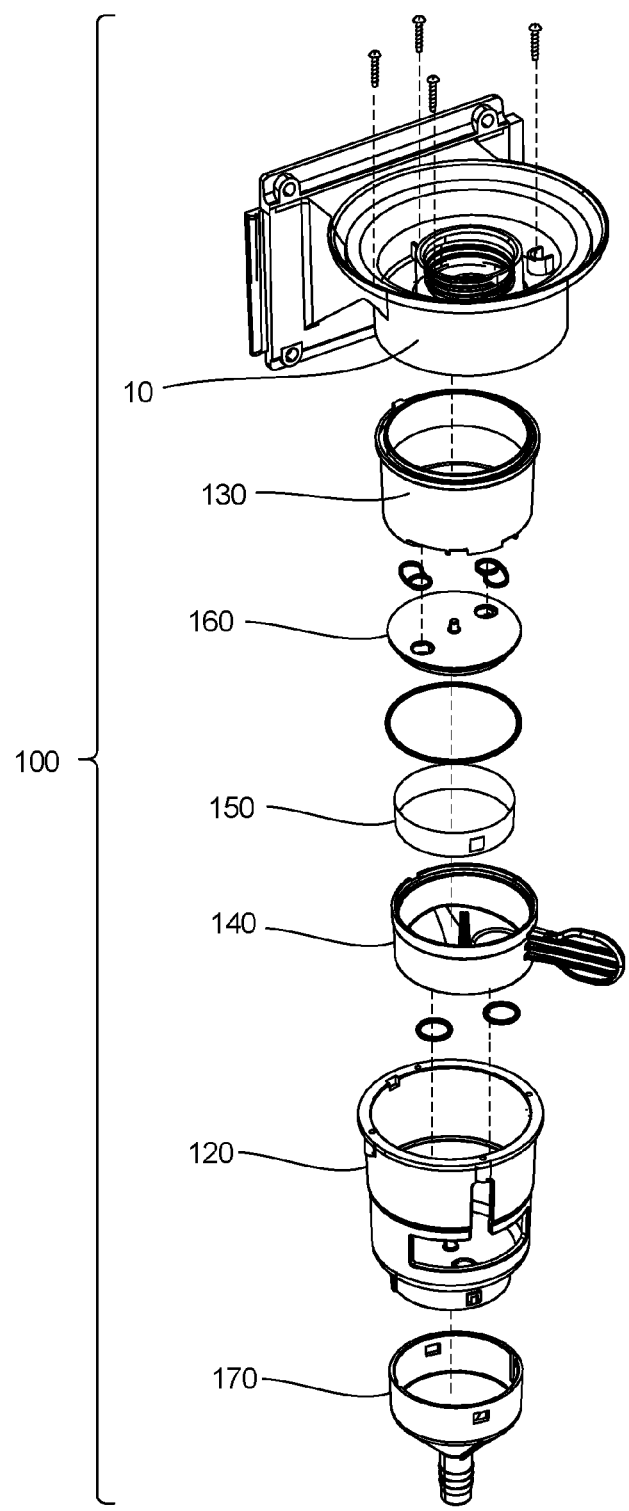
FIG. 5 is an exploded view of the dosing cup and dispenser base of the present invention.

The chemical dosing device 100 of the present invention is shown in exploded view in FIG. 5. The dosing device 100 includes a valve housing 120 (see also FIGS. 6 and 6A) that mounts to the bottom of the dispenser base 10 by screws, a threaded recess or other suitable means. Mounted within the valve housing 120 is reservoir 130 for holding liquid (see also FIGS. 7 and 7A), a dosing cup 140 of select size (see also FIGS. 8 and 8A), an optional spacer 150 (see also FIG. 9) and an upper disk or cap 160 (see also FIGS. 10 and 10A). A funnel 170 (see also FIGS. 11 and 11A) is mounted to the bottom of the valve housing 120 by a flexible snap lock or other known means. Various seals, discussed infra, make the system leak proof.

Figure 6A:
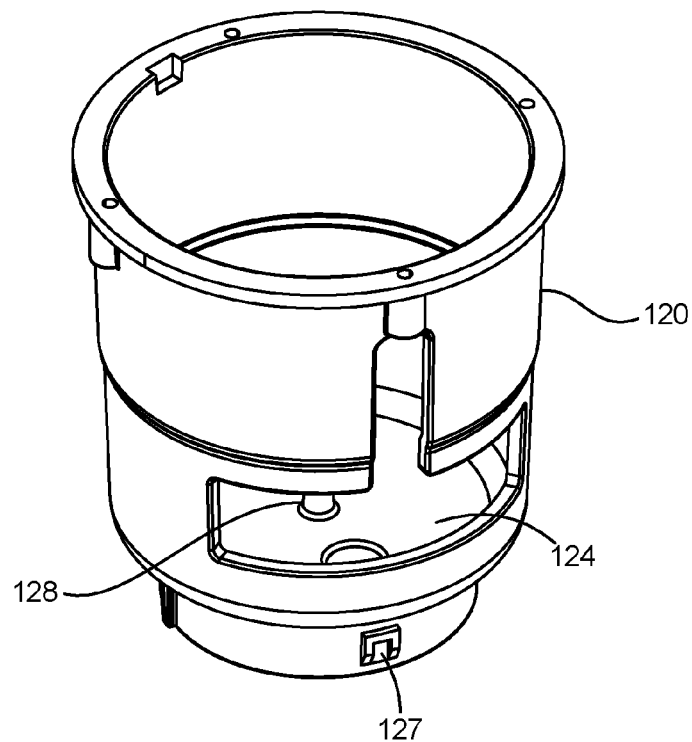
FIG. 6A is a side view of the dosing device of the present invention with portions cut away, showing the housing.
Figure 6B:
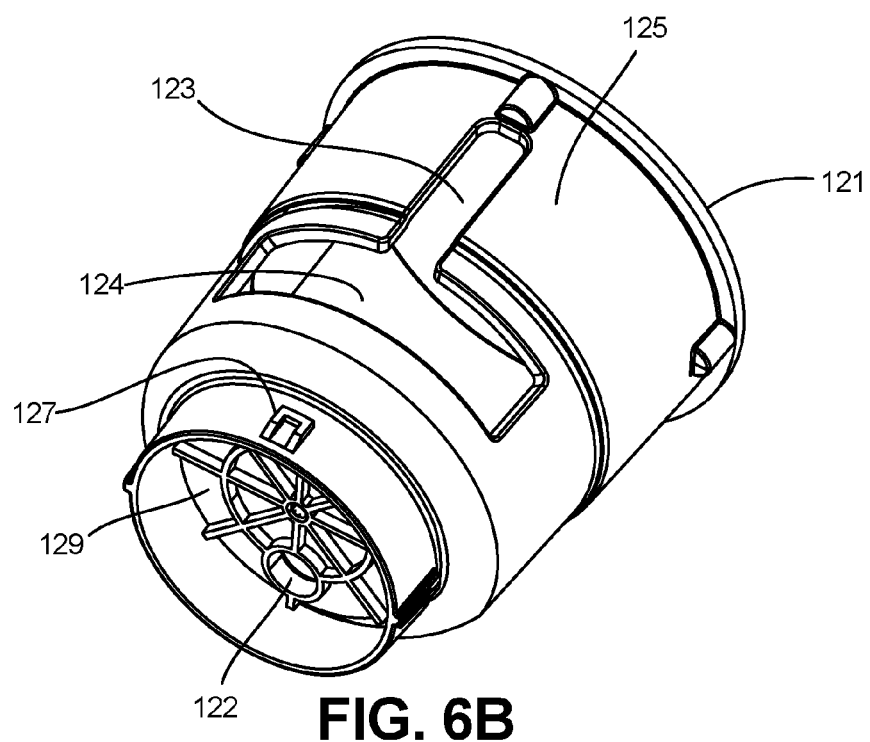
FIG. 6B is a perspective view of the dosing device of the present invention showing the housing.

As shown in FIGS. 6 and 6A, in one embodiment, the valve housing 120 is a generally hollow cylinder that includes an annular lip 121 for mating the housing to the bottom of the dispenser base, over the outlet port 19. The bottom of the base includes at least one outlet port 122, a blocking region 129 (the solid bottom less the outlet ports), an elongated slot 123 along a longitudinal side of the valve housing to receive a handle of the dosing cup when the dosing device is assembled and a second transverse elongated slot 124 defined along a side 125 of the valve housing to permit rotational movement of the handle transverse to the longitudinal axis of the valve housing. A snap lock 127 or other known means is provided at the open bottom of the cylinder for attaching funnel 170. A short protrusion 128 extends upward from the center bottom of the valve housing, generally along the longitudinal axis of the valve housing, for engaging the dosing cup.

Figure 7:
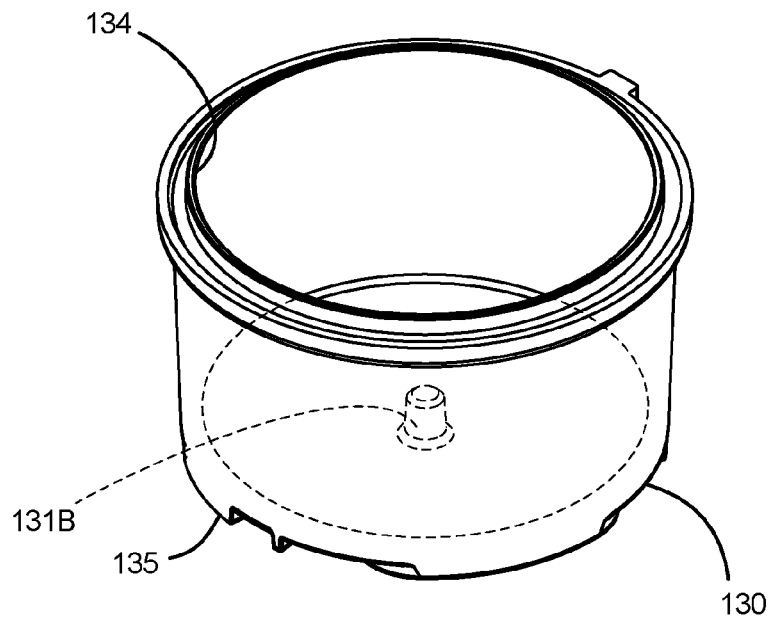
FIG. 7 is a perspective view of a reservoir from the top.
Figure 7A:
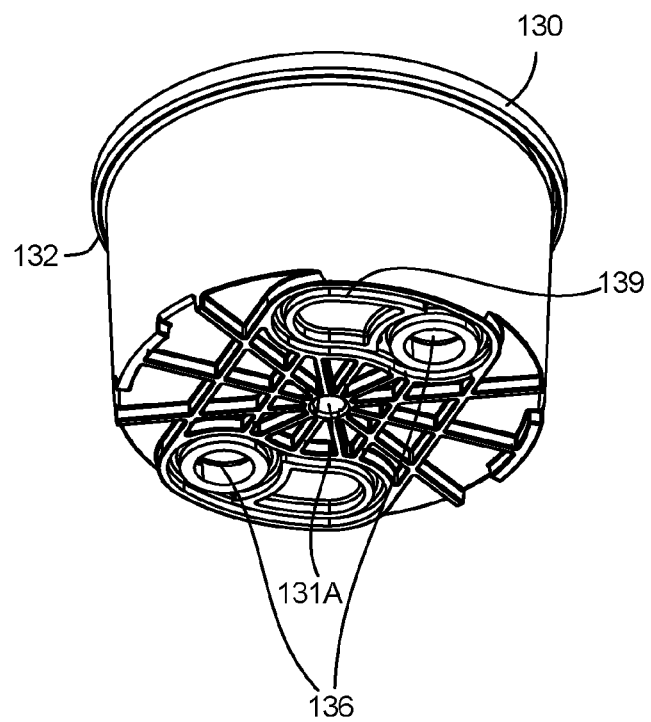
FIG. 7A is a perspective view of a reservoir from the bottom.

As shown in FIGS. 7 and 7A, reservoir 130 is generally a cylindrical cup and includes at the top an upper annular lip 132 for engaging the dispenser base. The reservoir also mounts over the dispenser base outlet to receive fluid from the dispenser base outlet. The reservoir is mounted so air holes 11 in the dispenser base are in fluid communication with the reservoir. This allows air to enter the reservoir when the reservoir contents are emptied into the dosing cup.

An annular recess 134 is formed by the annular lip for receiving in mating engagement an O ring (not shown) to form a tight seal with the bottom of the dispenser base.

Figure 23:
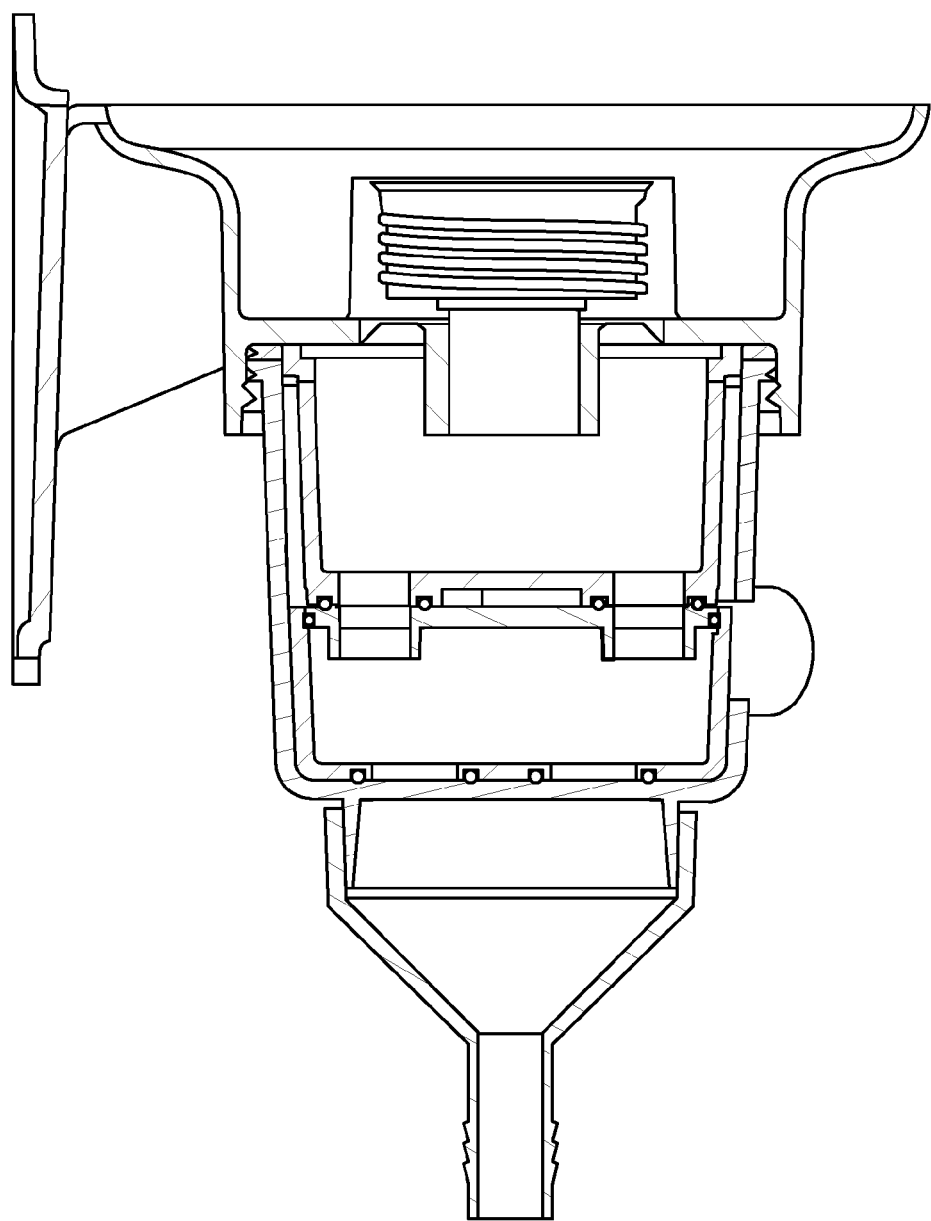
FIG. 23 is a side view of the assembled dosing device of the present invention with sections cut away to illustrate the dosing cup in its standby or closed position.

In a preferred embodiment, as shown in FIG. 23, the dispenser base includes spacers 200 placed on the bottom surface of the dispenser base, in alignment with the lip 121 of the valve housing. When the valve housing is screwed or otherwise secured to the bottom of the dispenser base, the spacers limit the compression on the reservoir seals and cup seals to prevent over-compression of and damage to the seals to ensure proper performance.

The reservoir further includes at least one, and in one preferred embodiment, two outlet openings or ports 136 through the bottom of the reservoir. On the bottom of the reservoir, for each outlet port 136, there is an arcuate recess 138. Part of the recess is concentric with the outlet port; the remainder of the recess extends along a blocking region of the reservoir. (The arc of the recess is generally defined by a distance from the center of the cup to the center of the outlet port and has a width greater than the diameter of the outlet port.)

Outlet port seals 138 (FIGS. 12A-12E) are mounted within the recess 139 formed on the bottom of the reservoir to form a seal with the top of the upper disk 160. In one embodiment, seals 138 made of Aflas® brand fluoroelastomers with a 70 Shore A durometer hardness and form a seal between the bottom of the reservoir and the top of the upper disk 160 to prevent leakage of liquid chemical from the reservoir into the valve housing and dosing cup.

In a preferred embodiment, the recesses have sides that limit the compression on the outlet port seals to prevent over-compression of and damage to the seals to ensure proper performance.

At the bottom of the reservoir is a recess 131A formed by a protrusion 131B extending upward from the top surface of the bottom of the reservoir. The recess engages in mating relation a protrusion 152 from the cap 160 of the dosing cup.

Also at the bottom of the reservoir are tabs or spacers 135 that are generally positioned between the seal recesses 139. The tabs extend a distance below the bottom of the reservoir that is roughly equal to the space required for the seals so the reservoir will mate properly with the cap 160. Further, this arrangement allows air to enter the dosing cup while in the dose position, discussed infra.

Figure 8:
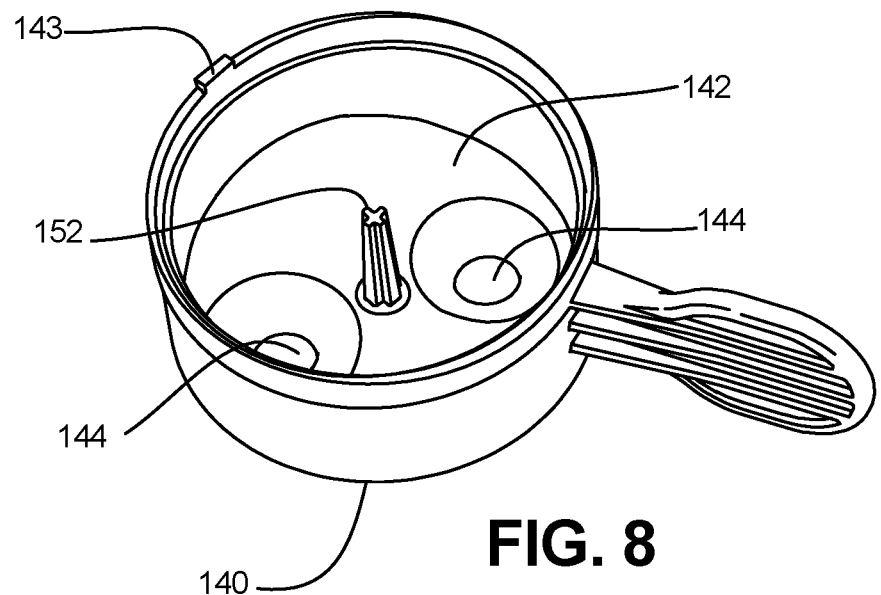
FIG. 8 is a perspective view of a dosing cup from the top.
Figure 8A:
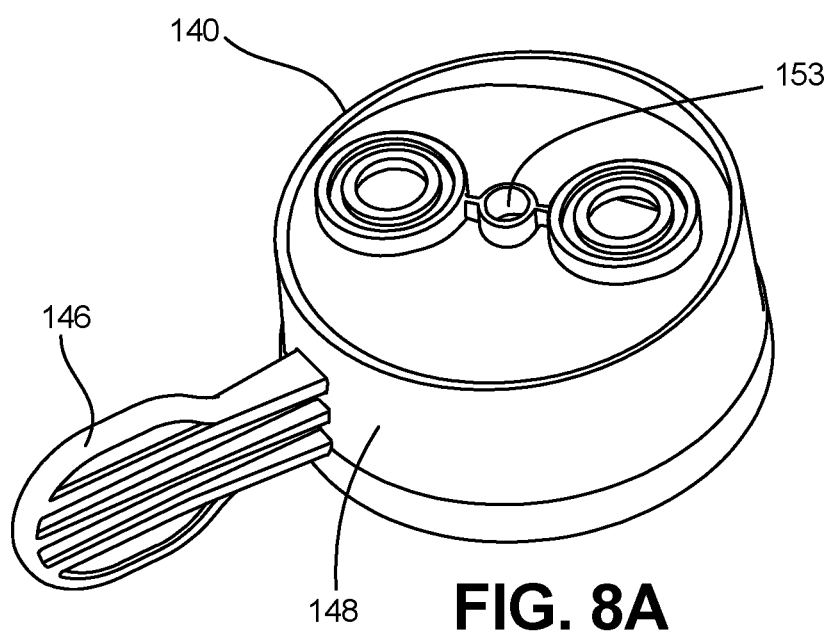
FIG. 8A is a perspective view of a dosing cup from the bottom.
Figure 9:
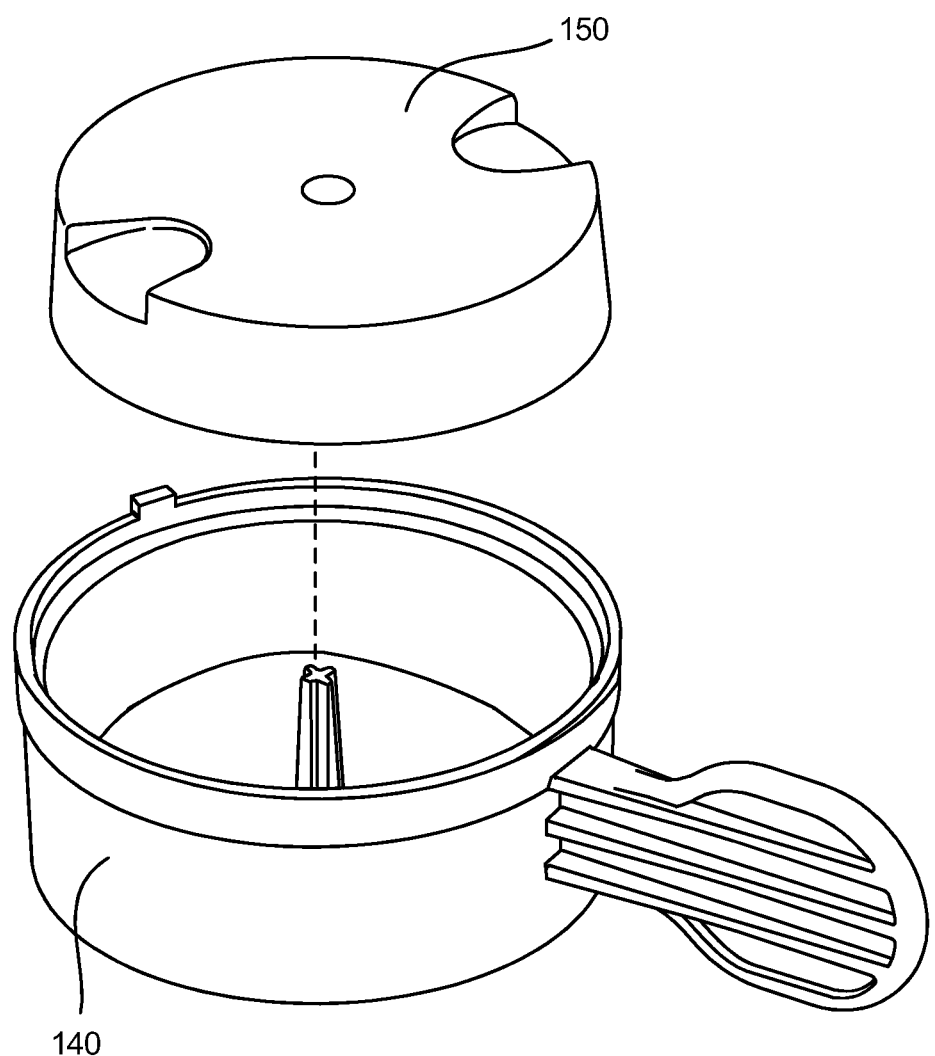
FIG. 9 is a perspective view of a dosing cup and spacer from the top illustrating step 2 of assembling the dosing device of the present invention.

Referring to FIGS. 8 and 8A, mounted below the reservoir 120 is dosing cup 140. Dosing cup 140 has an open top 142. Defined at the top of the dosing cup is an annular recess for engaging and supporting the cap 160 and a tab 143 extending upward to engage a notch in the cap to keep the cap from rotating on the dosing cup. (The tab could also be a recess and the cap could be provided with an engagement tab.)

The dosing cup includes a dosing lever 146 attached to a side 148 of the dosing cup 140. When the dosing cup is mounted within the valve housing, the dumping handle extends through the transverse slot or opening 124 in the side of the valve housing 120 for rotational movement between a "fill" position and a "dose" position.

A support spindle 152 extends upward from the center of the top surface of the bottom of the dosing cup 140 to support the spacer 150.

Formed through the bottom of the dosing cup is at least one outlet port 144. The bottom of the dosing cup is tapered around each outlet port to cause the liquid to flow through the outlet port.

Figure 13A:
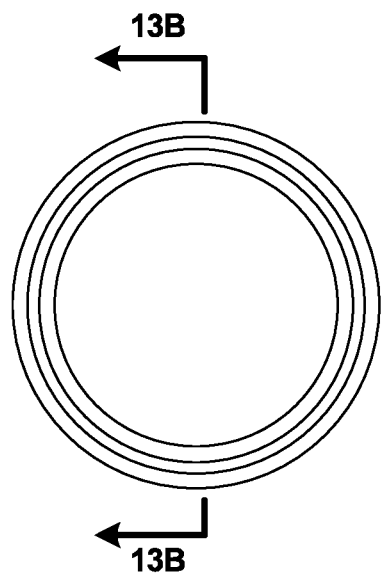
FIG. 13A is a schematic view of a dosing cup O-ring.
Figure 13B:
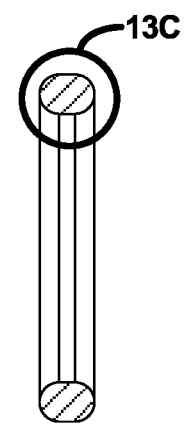
FIG. 13B is sectional view of FIG. 13A taken along line A-A.
Figure 13C:
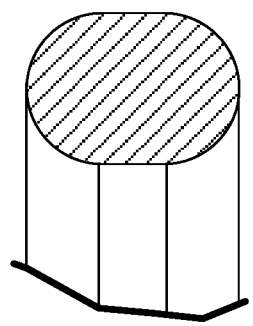
FIG. 13C is a detailed view of a cross section of the O-ring along line 13B as shown in FIG. 13A.

Formed on the bottom of the dosing cup, in alignment with the support spindle, is a recess 153 for receiving the protrusion 128 of the valve housing. Also formed on the bottom of the dosing cup are recesses concentric with and larger than the outlet ports 144. O-rings 149 (see also FIG. 13A-13C) are mounted within these recesses to create a seal with the bottom of valve housing 120. In one embodiment, the O-rings, 149 are made of Aflas® brand fluoroelastomers with a 70 Shore A durometer hardness and form a seal between the bottom of the dose cup and the valve housing.

In a preferred embodiment, the O ring recesses have sides that limit the compression on the outlet port seals to prevent over-compression of and damage to the seals to ensure proper performance.

Spacer 150 (see FIG. 9) of desired size is optionally mounted within the dosing cup 140 on spindle 152 to limit the volume of liquid that can be contained in the dosing cup 140. Alternatively, the size of the dosing cup can be modified to define a desired volume of liquid to be "dosed." In one preferred system, dose chemical products come in product capsule sizes of 64 oz or 32 oz, although other sizes are possible. (A corresponding change in the valve housing may be necessary.)

Dosing cups and valve housings can be color coordinated to identify the quantity of chemical dispensed. For example, green colored housings indicate that the dispenser will dispense 1.5 oz of chemical concentrate and gold colored housings indicate that the dispenser will dispense 0.5 oz of chemical concentrate. Other colors or designs are anticipated by the present invention.

Figure 10:
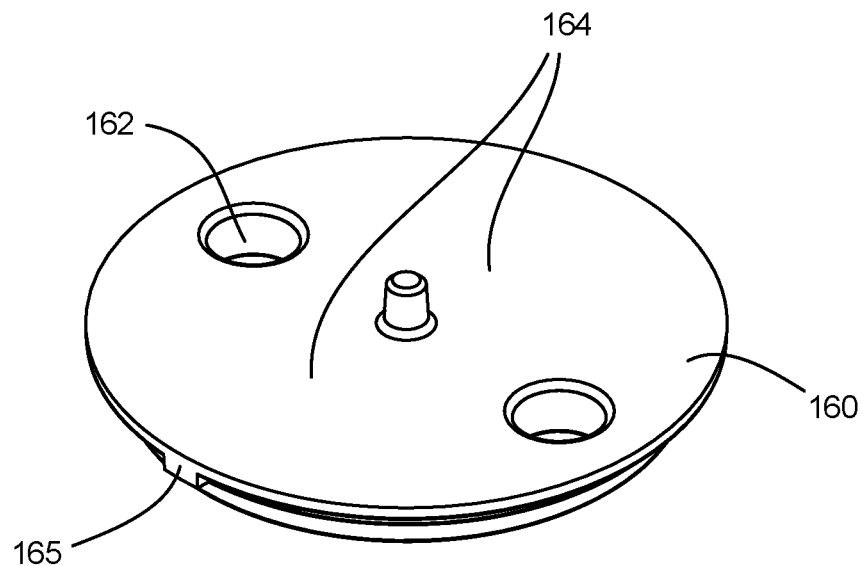
FIG. 10 is a perspective view of an upper disk from the top.
Figure 10A:
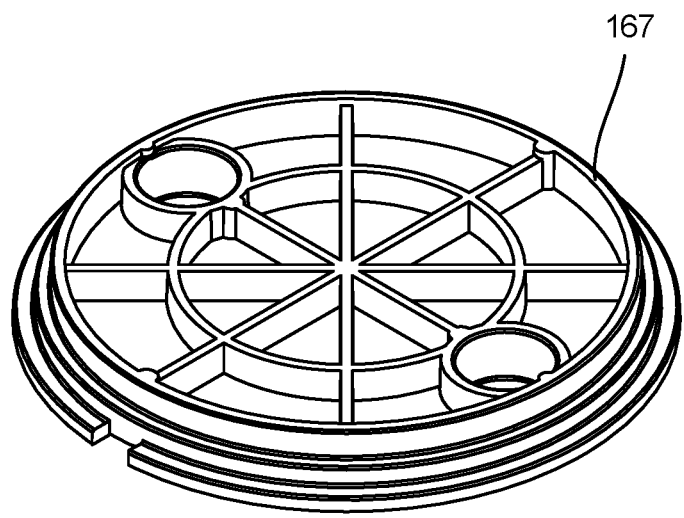
FIG. 10A is a perspective view of an upper disk from the bottom.
Figure 11:
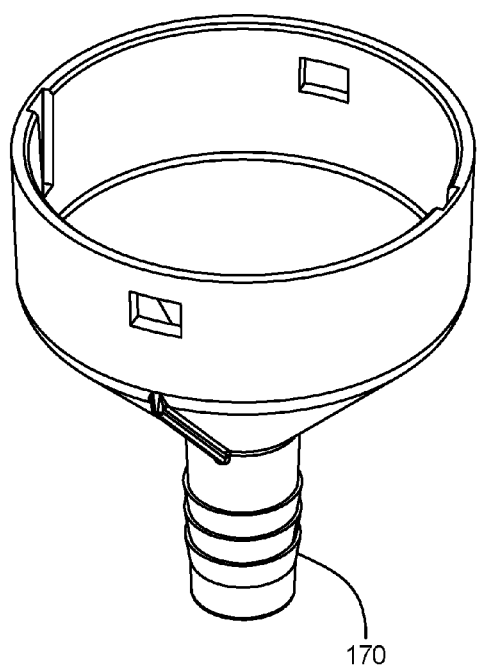
FIG. 11 is a perspective view of a funnel from the side.
Figure 11A:
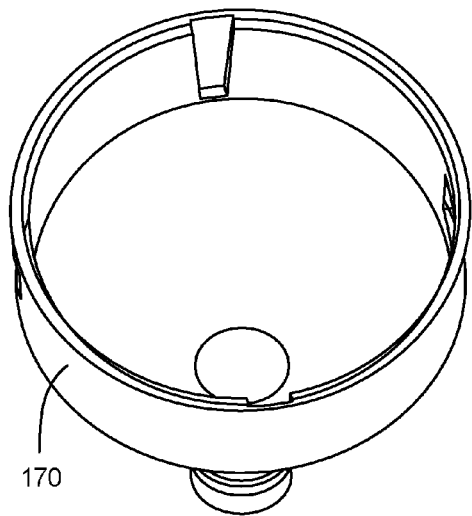
FIG. 11A is a perspective view of a funnel from the top.
Figure 12A:
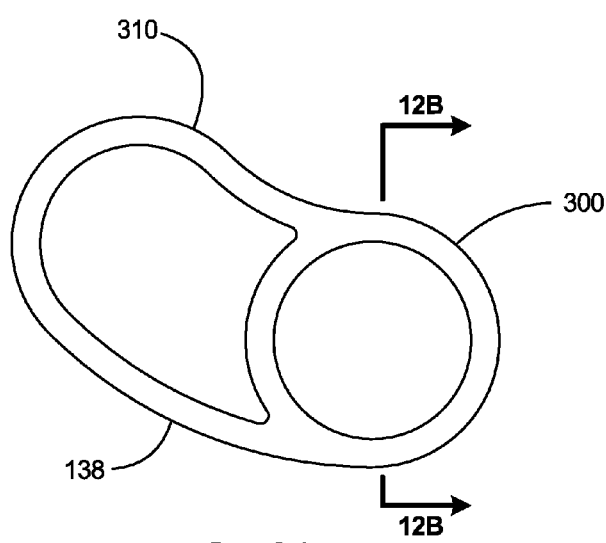
FIG. 12A is a schematic view of a reservoir O-ring.
Figure 12B:
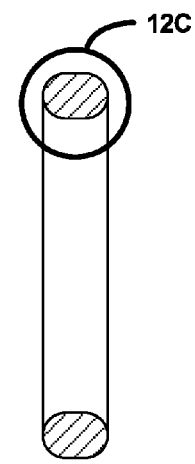
FIG. 12B is sectional view of FIG. 12A taken along line A-A.
Figure 12C:
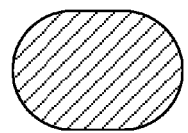
FIG. 12C is a detailed view of a cross section of the O-ring along line 12B as shown at B in FIG. 12A.
Figure 12D:
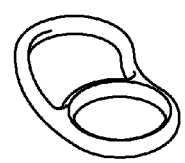
FIG. 12D is a perspective view of a sketch of the reservoir O-ring.
Figure 12E:
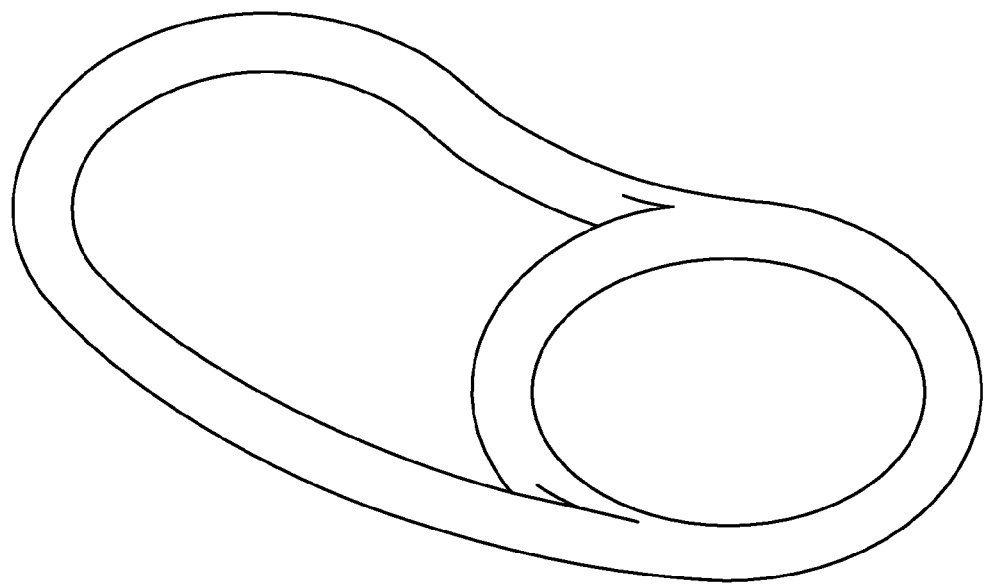
FIG. 12E is a perspective view of the reservoir O-ring.

Referring to FIGS. 10 and 10A, an upper disk/seal plate/cap 160 is mounted to the open top of the dosing cup. The cap includes at least one, and in one preferred embodiment two, inlet ports 162 and a blocking region 164. At an outer edge of the upper disk is a notch for engaging the tab 143 on the dosing cup. Protrusion 152 extends upward from the top surface of the cap to engage the recess 131A of the reservoir.

Figure 15:
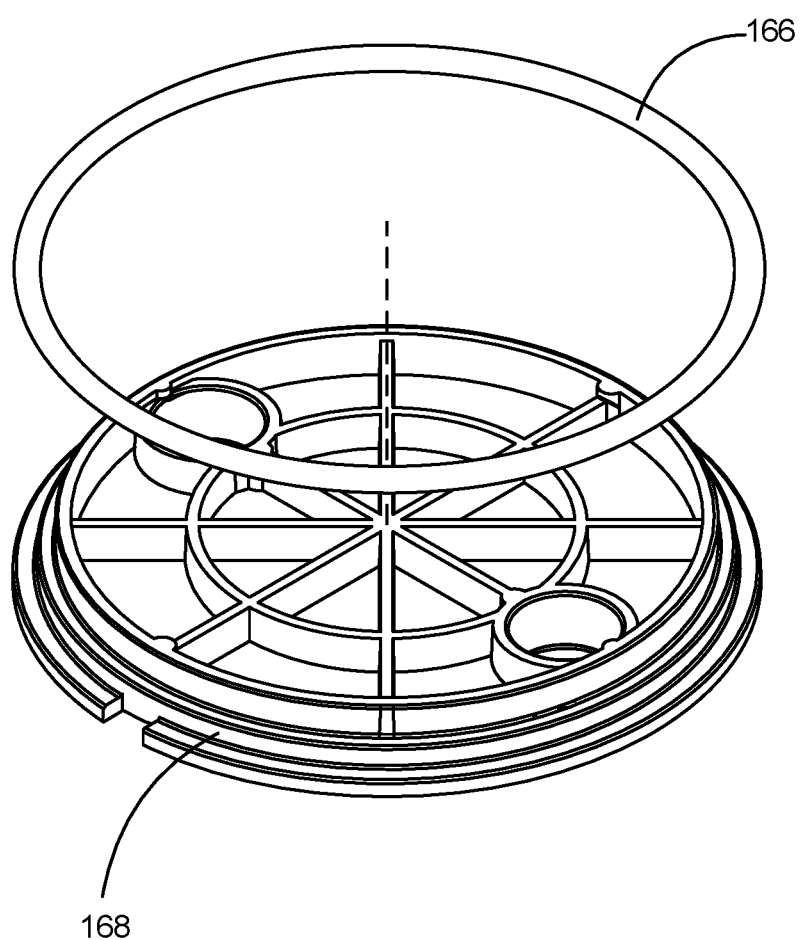
FIG. 15 discloses step 3 of assembling the dosing device of the present, including inserting the O-ring onto the upper disk or seal plate.

On the bottom of the cap, an annular ledge 167 is formed for supporting an O-ring 166 (FIG. 15). The upper disk prevents liquid chemical from entering or escaping from the dosing cup 140 except through the cap inlet ports 162 or dosing cup outlet ports 144.

In an alternate embodiment, the dosing cup and cap can be formed as a single unit, eliminating the need for a seal between the cap and the cup.

Figure 14:
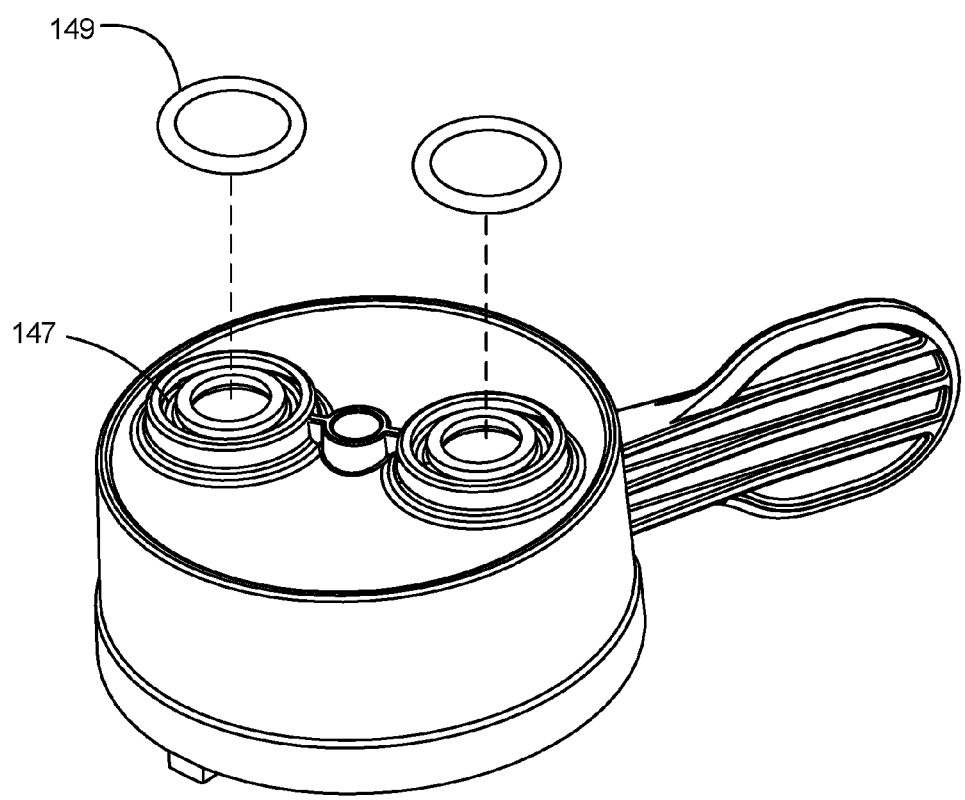
FIG. 14 discloses step 1 of assembling the dosing device of the present, including mounting O-rings to the dosing cup.
Figure 16:
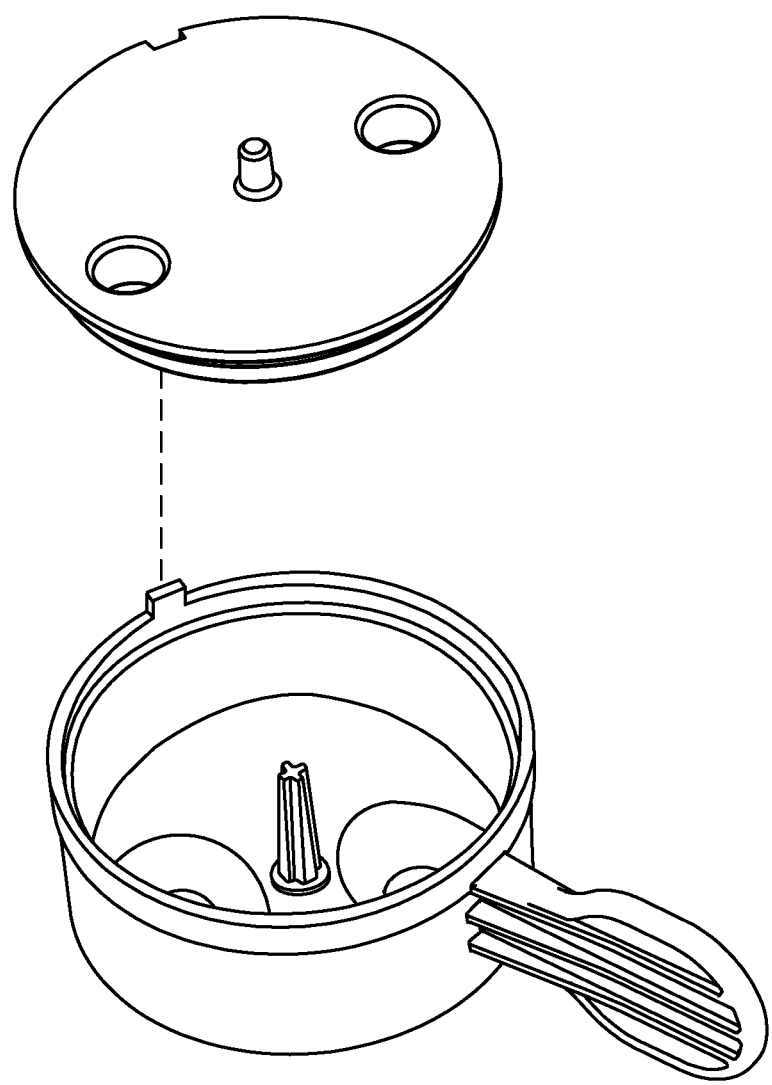
FIG. 16 discloses step 4 of assembling the dosing device of the present, including assembling the upper disk onto the dose cup.
Figure 17:
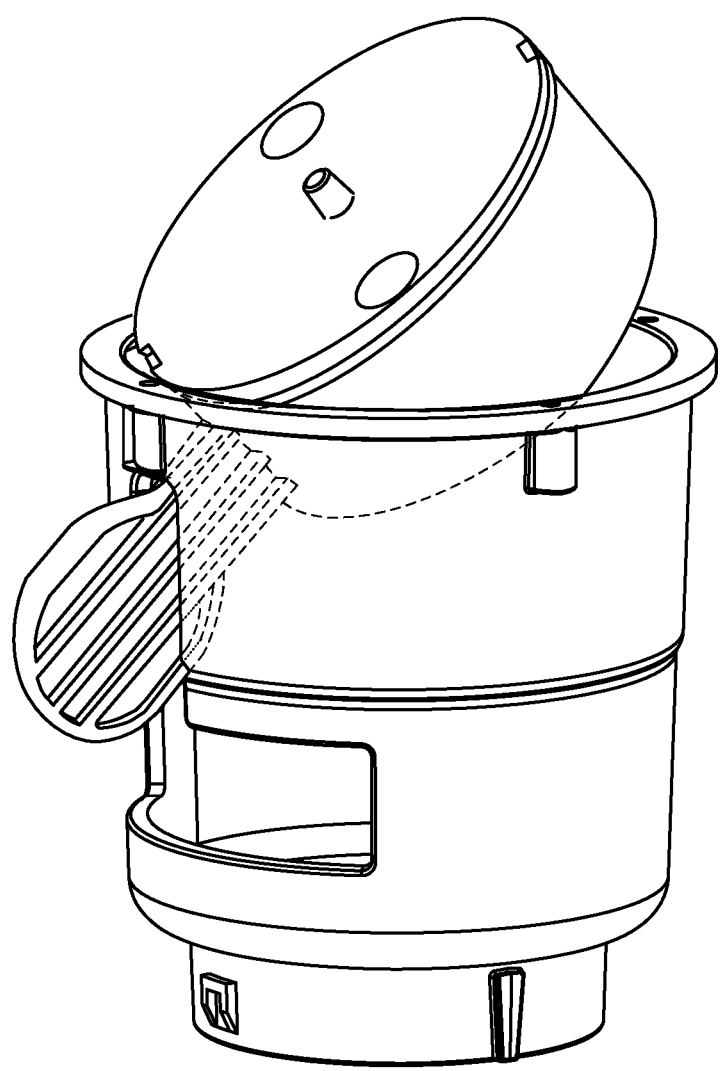
FIG. 17 discloses step 5 of assembling the dosing device of the present, including mounting the dosing cup in the housing.
Figure 18:
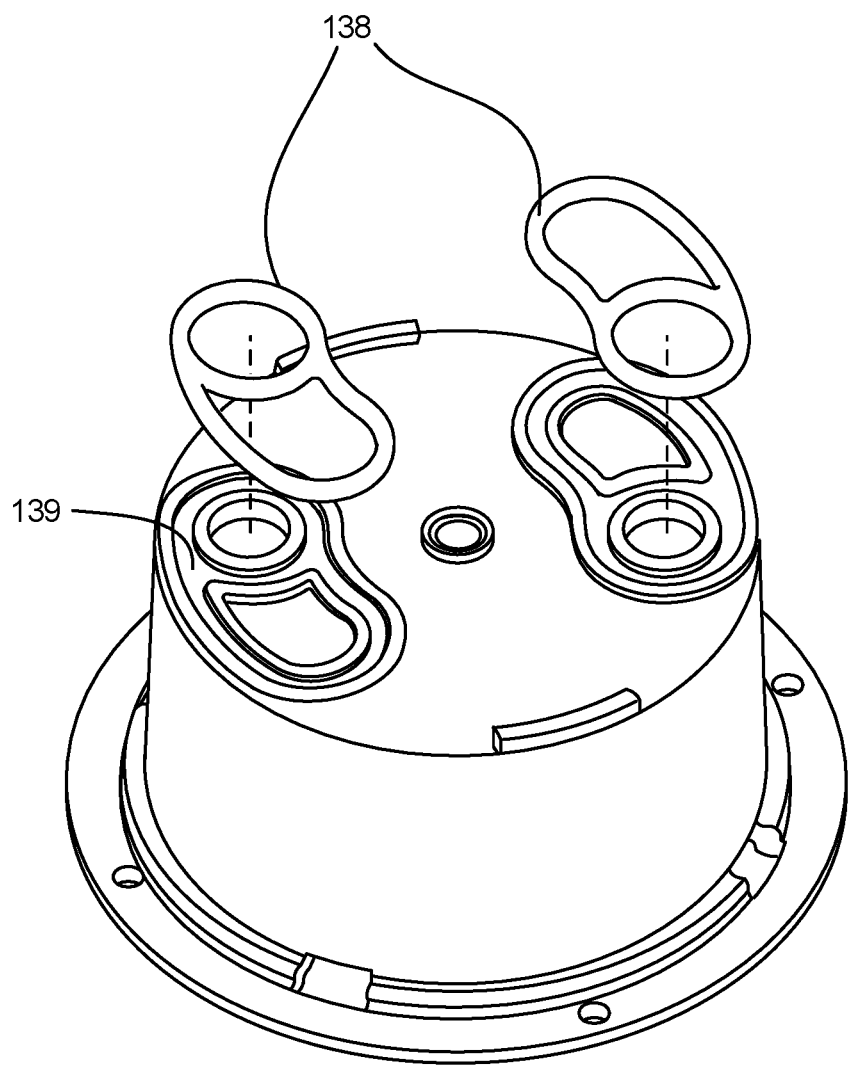
FIG. 18 discloses step 6 of assembling the dosing device of the present, including assembling the O-rings to the bottom of the reservoir.
Figure 19:
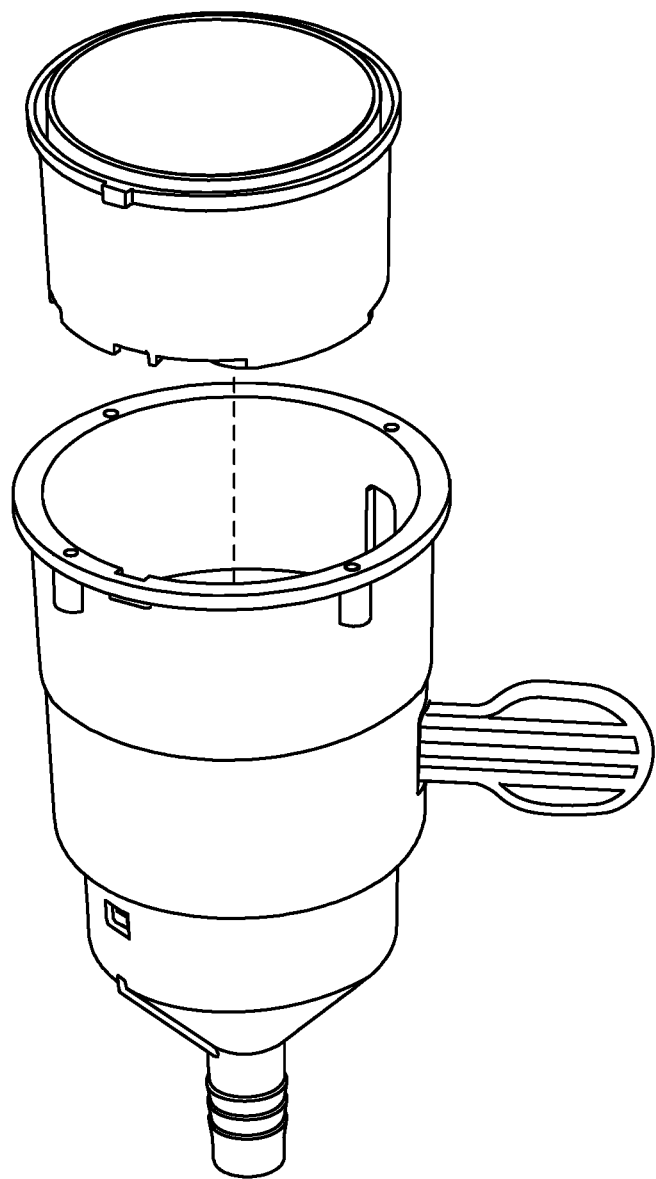
FIG. 19 discloses step 7 of assembling the dosing device of the present, including inserting the reservoir into the housing.
Figure 20:
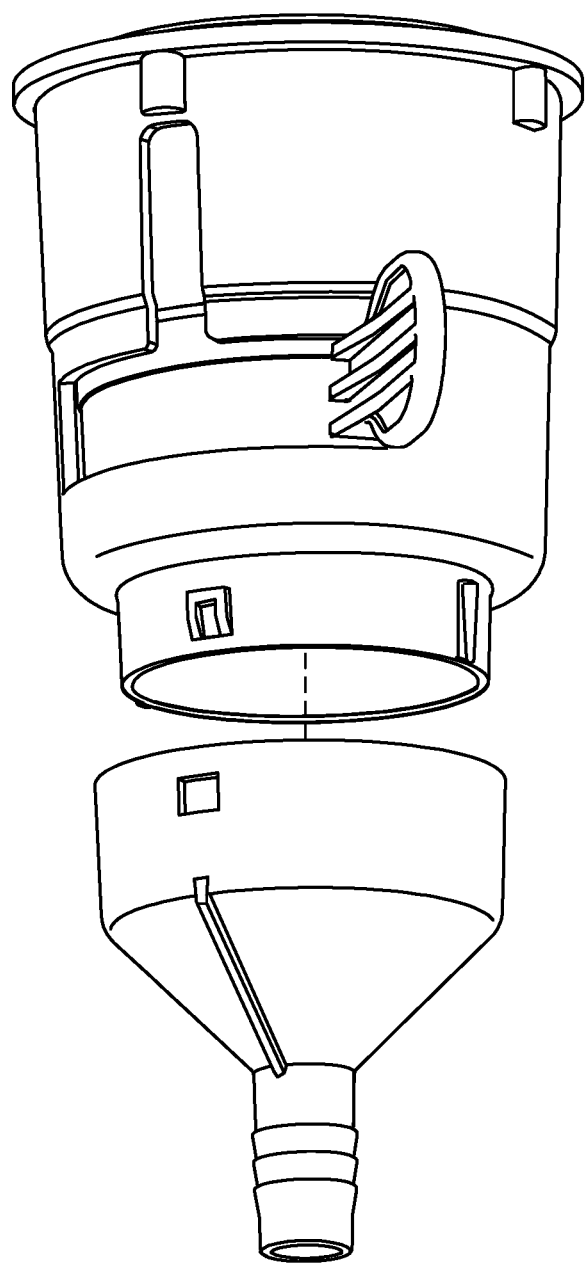
FIG. 20 discloses step 8 of assembling the dosing device of the present, including snapping the funnel onto the bottom of the housing.
Figure 21:
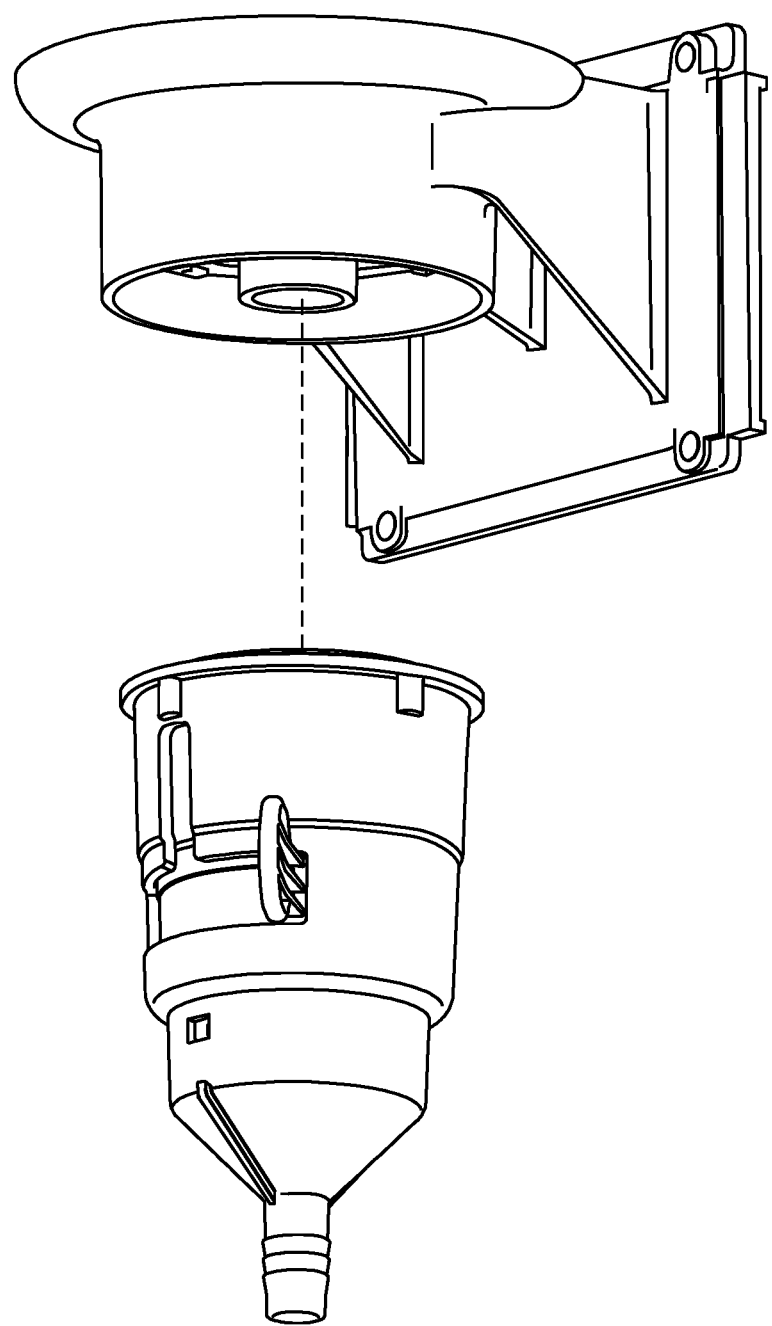
FIG. 21 discloses step 9 of assembling the dosing device of the present, including attaching the dosing device to the dispenser base.
Figure 22:
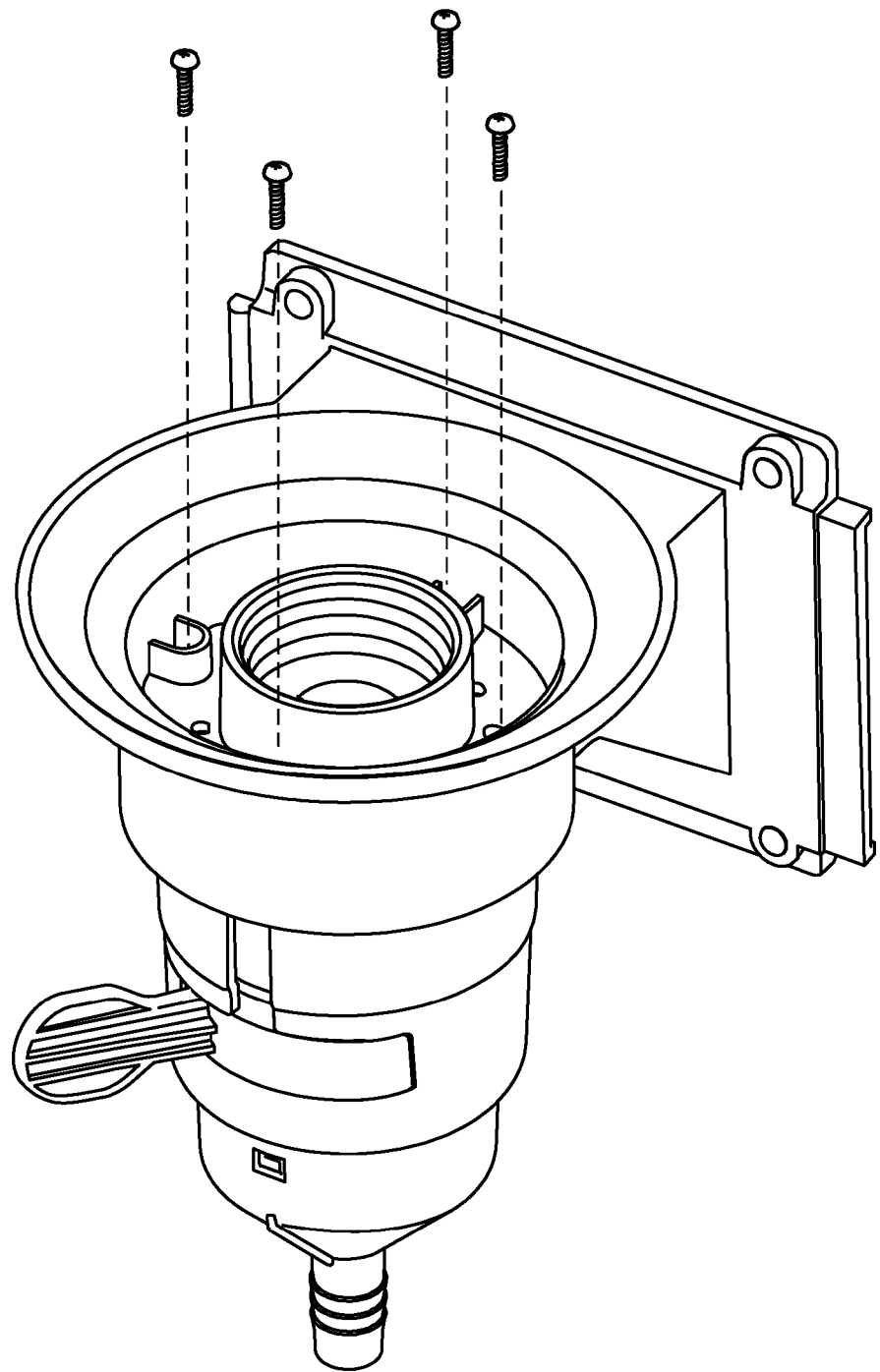
FIG. 22 discloses step 10 of assembling the dosing device of the present, including screwing the dosing device to the dispenser base.

To assemble the dosing device of the present invention, the following steps are followed:
1. mounting O-rings to the dosing cup (FIG. 14);
2. optionally inserting the spacer into the dosing cup (FIG. 9);
3. inserting the O-ring onto the upper disk or seal plate (FIG. 15);
4. assembling the upper disk onto the dose cup (FIG. 16);
5. mounting the dosing cup in the valve housing (FIG. 17);
6. assembling the seals to the bottom of the reservoir (FIG. 18);
7. inserting the reservoir into the housing (FIG. 19);
8. snapping the funnel onto the bottom of the housing (FIG. 20);
9. attaching the dosing device to the dispenser base (FIG. 21); and
10. screwing the dosing device to the dispenser base FIG. 22.

Mounting of the components in this fashion aligns all the component protrusions and corresponding recesses to keep the components axially aligned, which in turn keeps the inlet and outlet ports properly aligned.

Referring to FIGS. 23-31, in operation, the liquid container delivers liquid to the reservoir continuously. Further, the dosing cup is normally in its fill position (and can be biased in such position by a spring mechanism, not shown). Liquid is moved through the dispenser and dosing device by alignment or misalignment of the various component inlet and outlet ports caused by rotation of the dosing cup.

In the fill position, the reservoir outlet ports are aligned with the inlet ports of the cap, allowing liquid to enter the dosing cup. Simultaneously, the outlet ports of the dosing cup are aligned with the blocking region of the valve housing, preventing the liquid from escaping from the valve housing. Air enters the reservoir though air holes 11 in the dispensing base to expedite the flow of liquid.

Using the dump lever to rotate the dosing cup to the "dose" position causes the cap, which is fixed in position with respect to the dosing cup, to rotate so that the outlet ports of the reservoir are aligned with the blocking area of the cap preventing fluid from entering the dosing cup, and the dosing cup outlet ports are aligned with the outlet ports of the valve housing, allowing the liquid to be dispensed in measured dose or quantity (matching the dosing cup capacity, with or without spacer 150) from the valve housing. The funnel directs the fluid from the valve housing outlet ports in a narrow stream to a desired external container.

Figure 24:
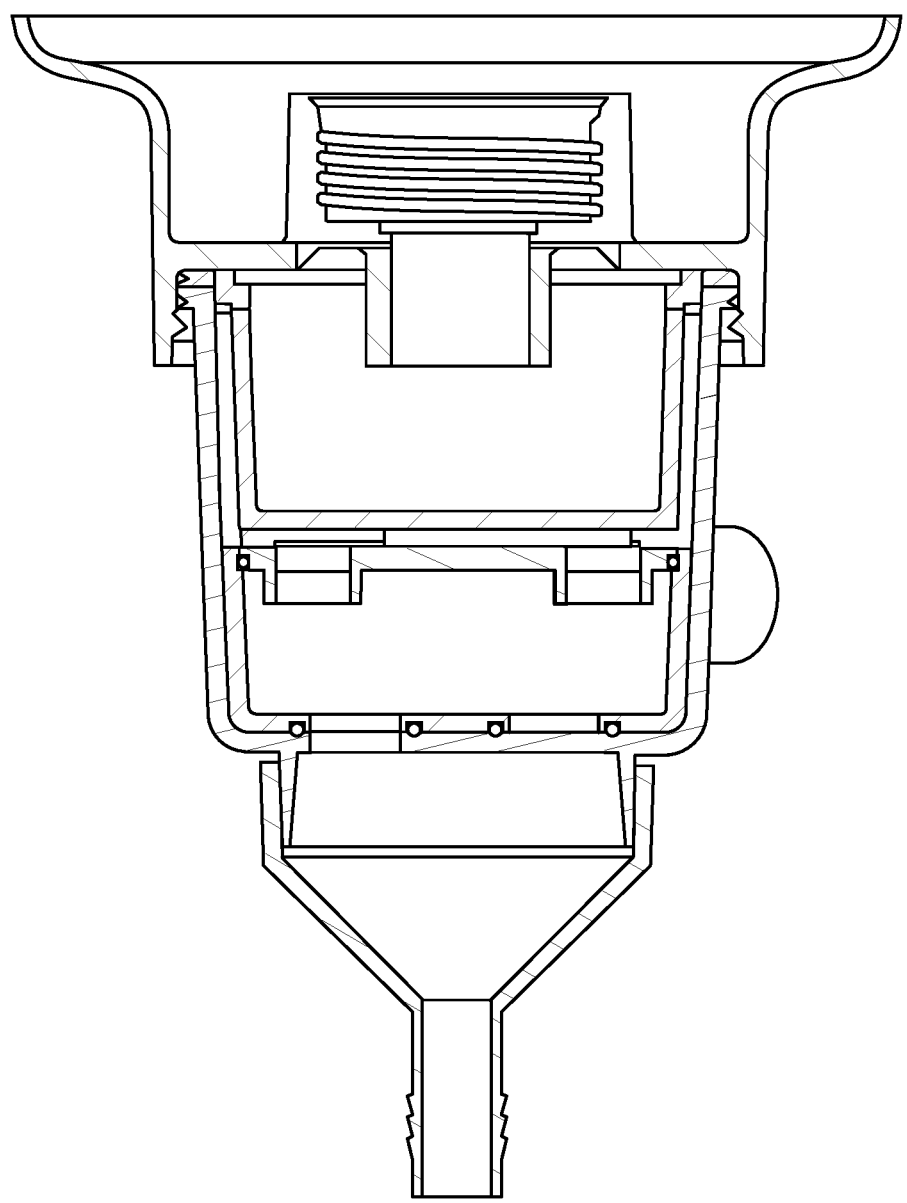
FIG. 24 is a front view of the assembled dosing device of the present invention with sections cut away to illustrate the dosing cup in its empty or open position.
Figure 25:
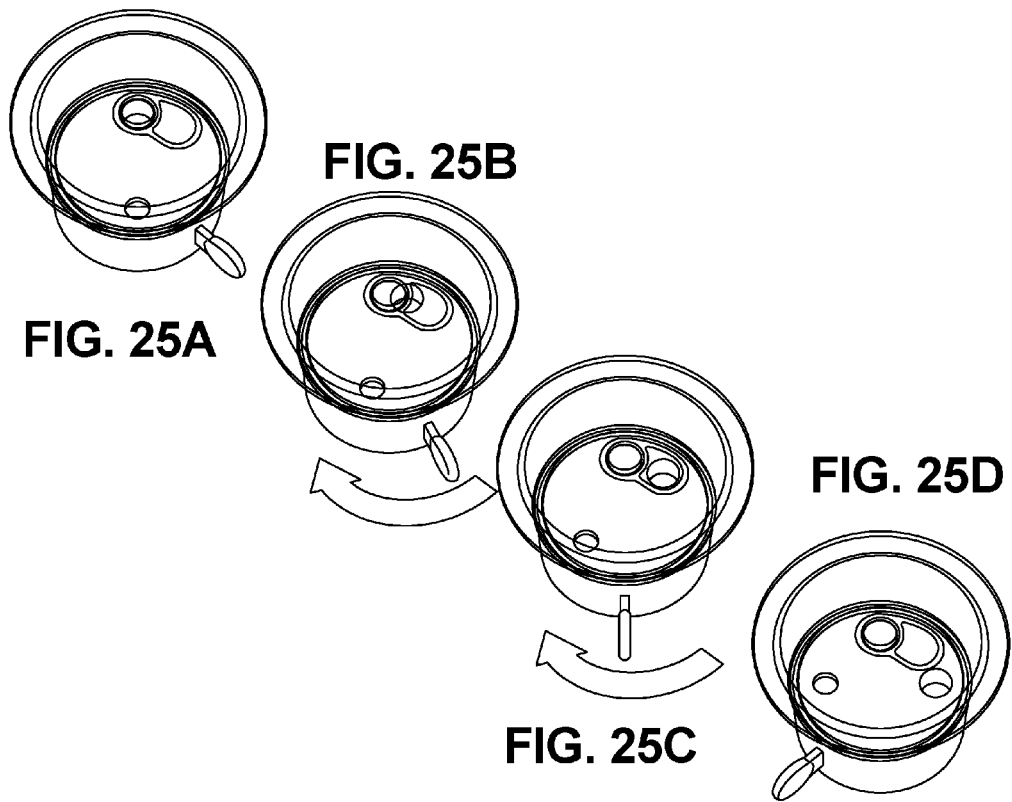
FIG. 25A is a perspective view of the dosing cup and reservoir in the fill position.
FIG. 25B is a perspective view of the dosing cup and reservoir as the dosing cup is moved from the fill to the dose position, illustrating the orientation of the outlet ports and O-ring seals as they control the flow of liquid chemical or other liquids.
FIG. 25C is a perspective view of the dosing cup and reservoir as the dosing cup is moved from the fill to the dose position, illustrating the orientation of the outlet ports and O-ring seals as they control the flow of liquid chemical or other liquids.
FIG. 25D is a perspective view of the dosing cup and reservoir in the dose position through the reservoir into the dosing cup.
Figure 26:
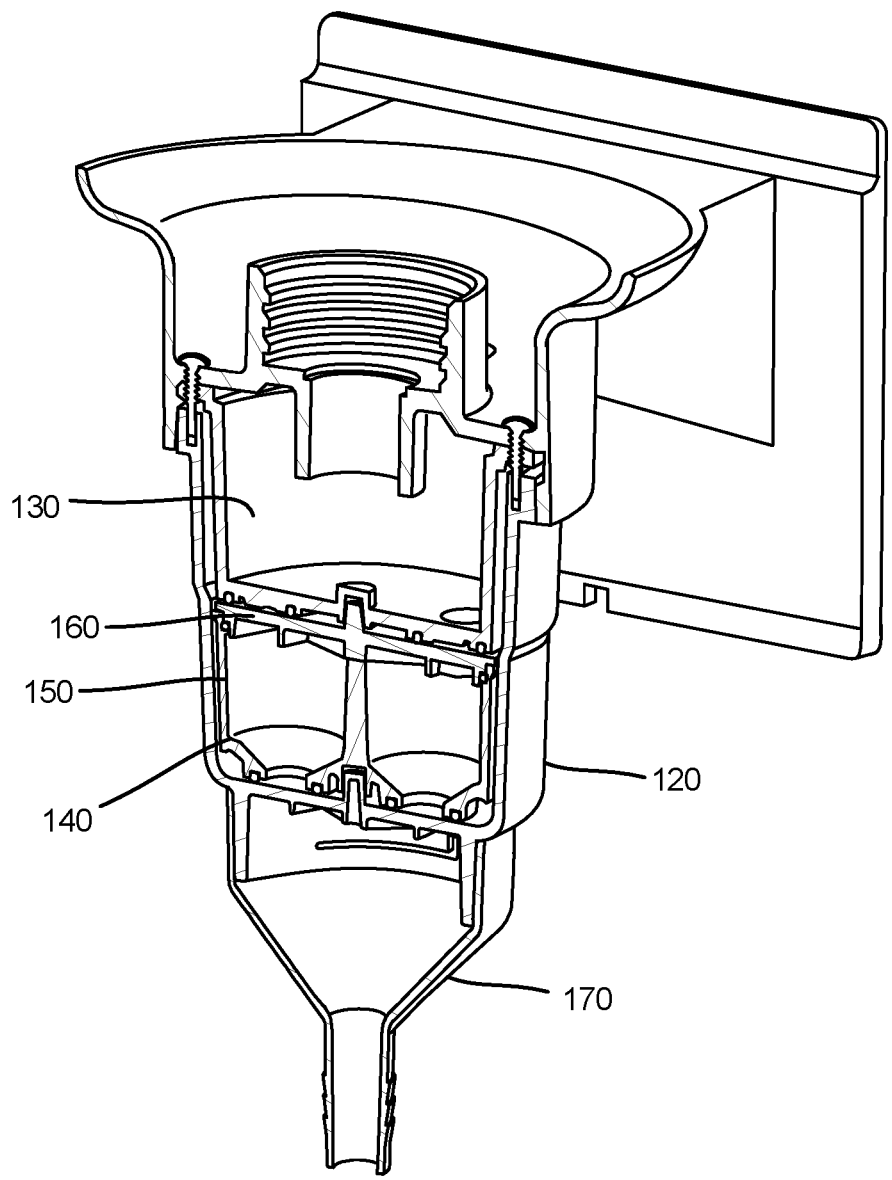
FIG. 26 is a side perspective view of the assembled dosing device of the present invention with sections cut away to illustrate the inner workings of the dosing device.
Figure 27:
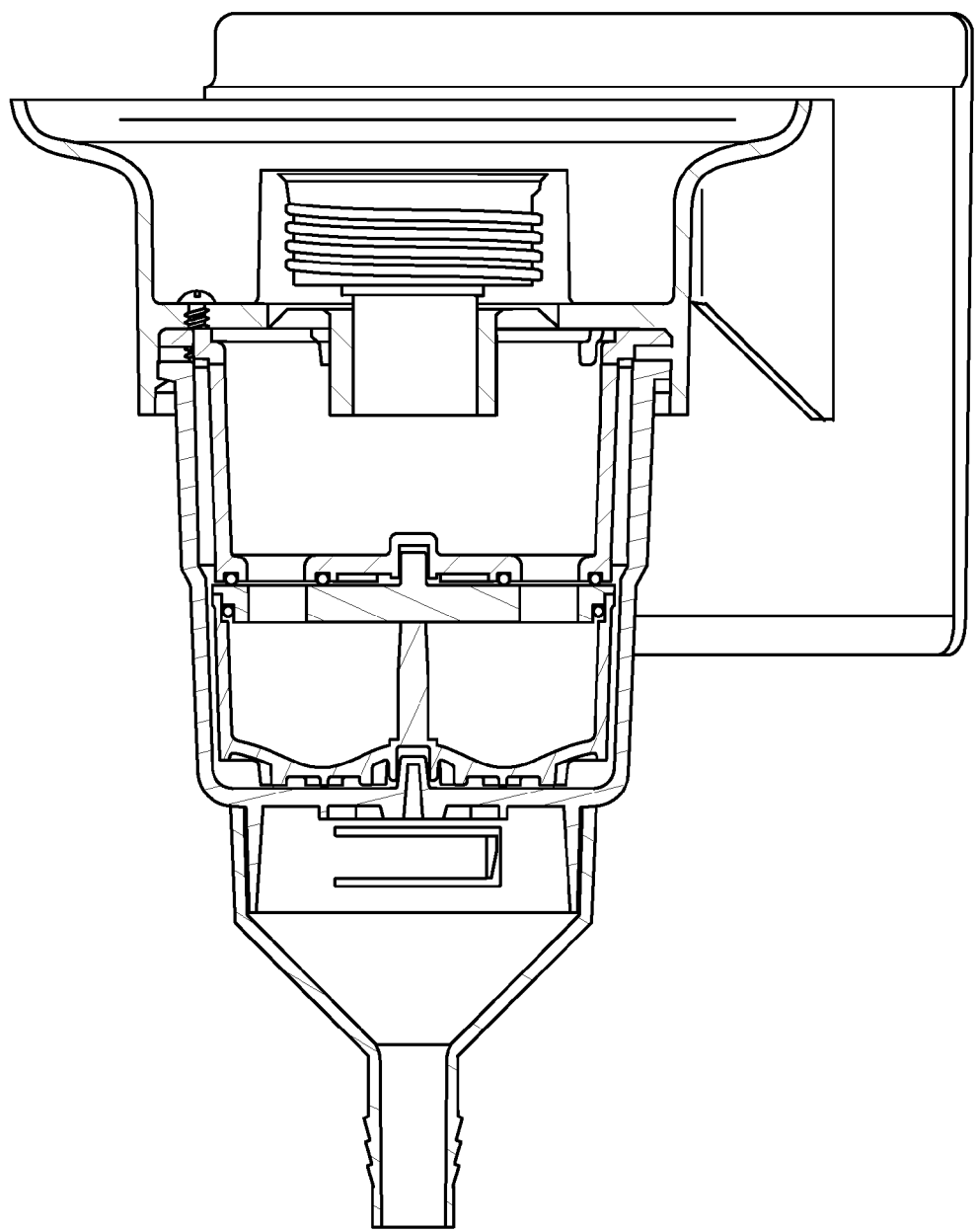
FIG. 27 is a front perspective view of the assembled dosing device of the present invention with sections cut away to illustrate the inner workings of the dosing device.
Figure 28A:
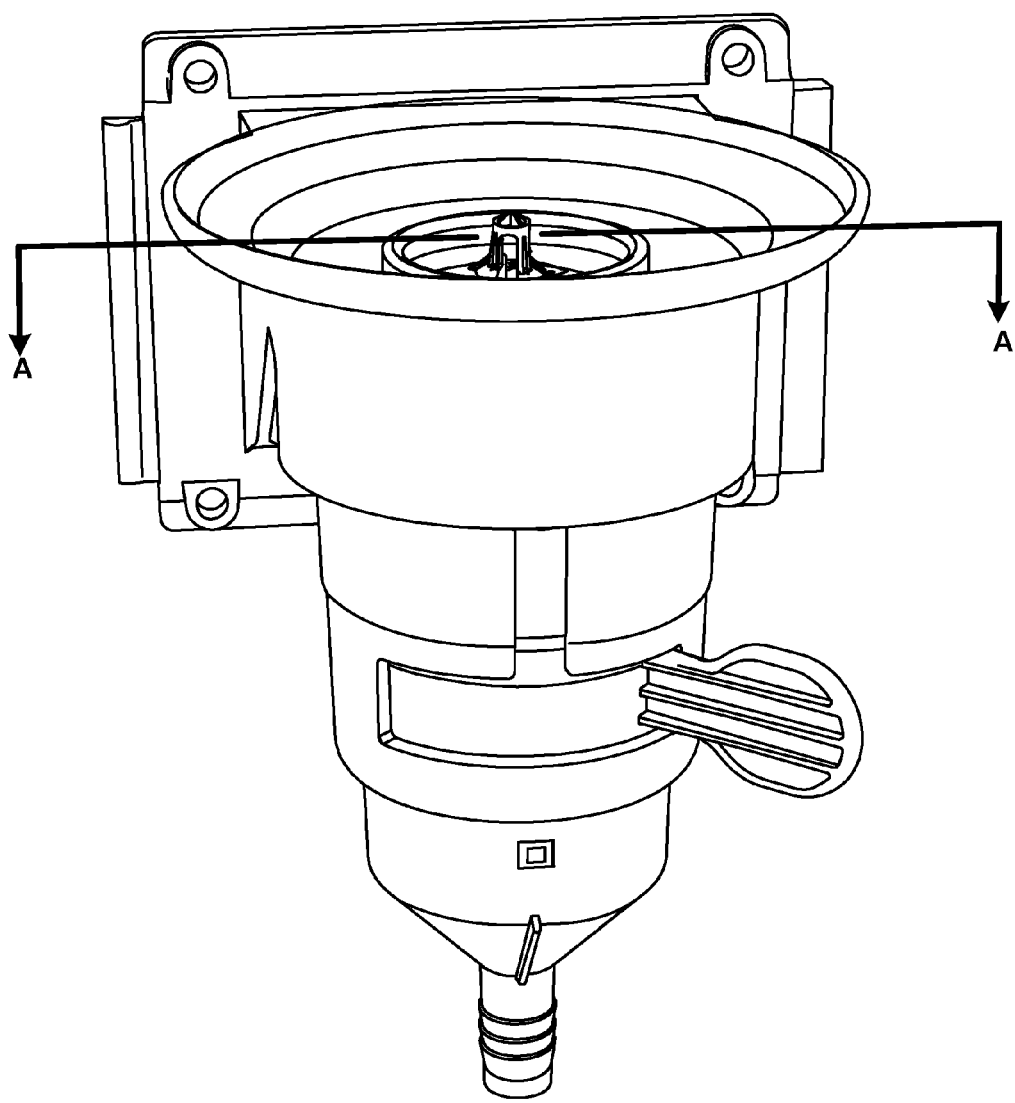
FIGS. 28A and 28B are perspective views of the assembled dosing device of the present invention with the dosing cup in its standby or closed position.
Figure 28B:
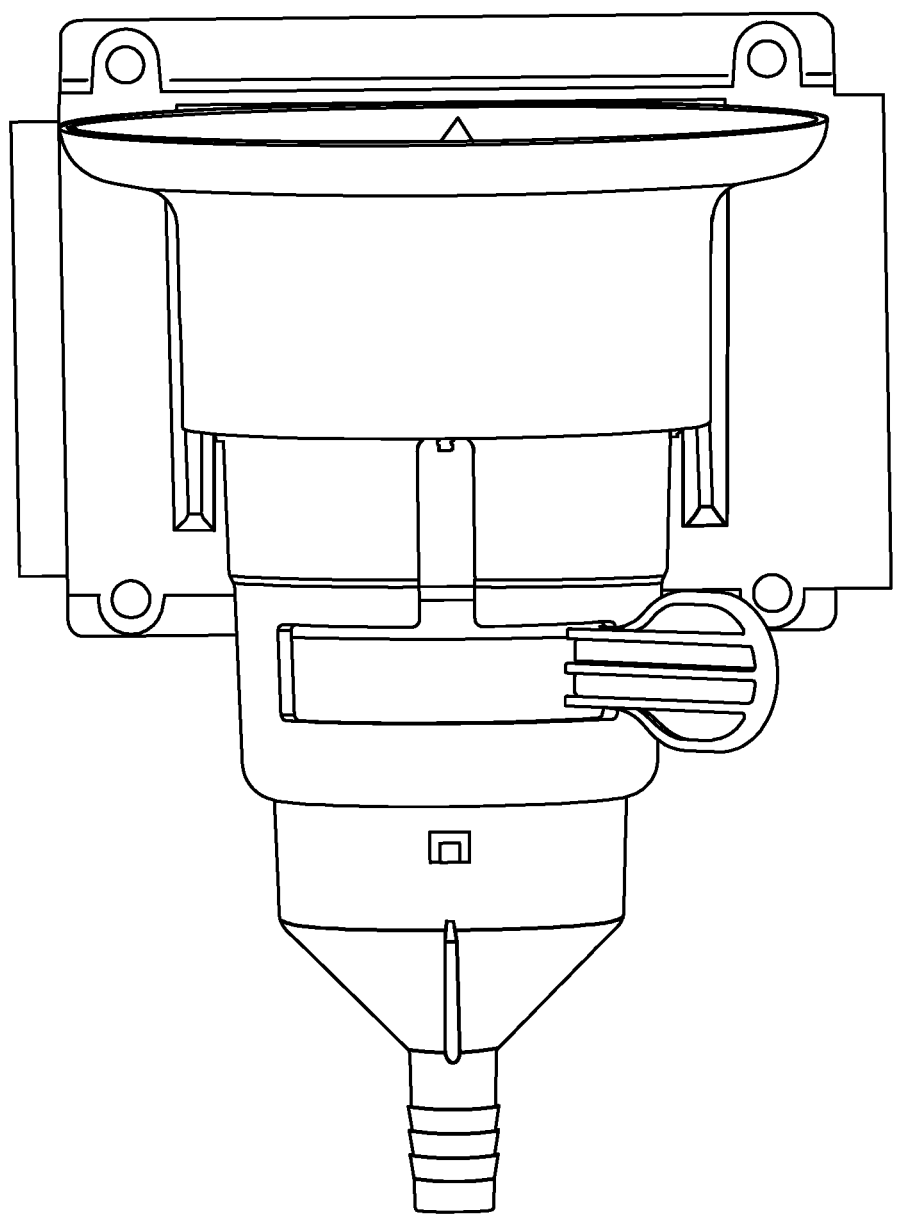
Figure 29:
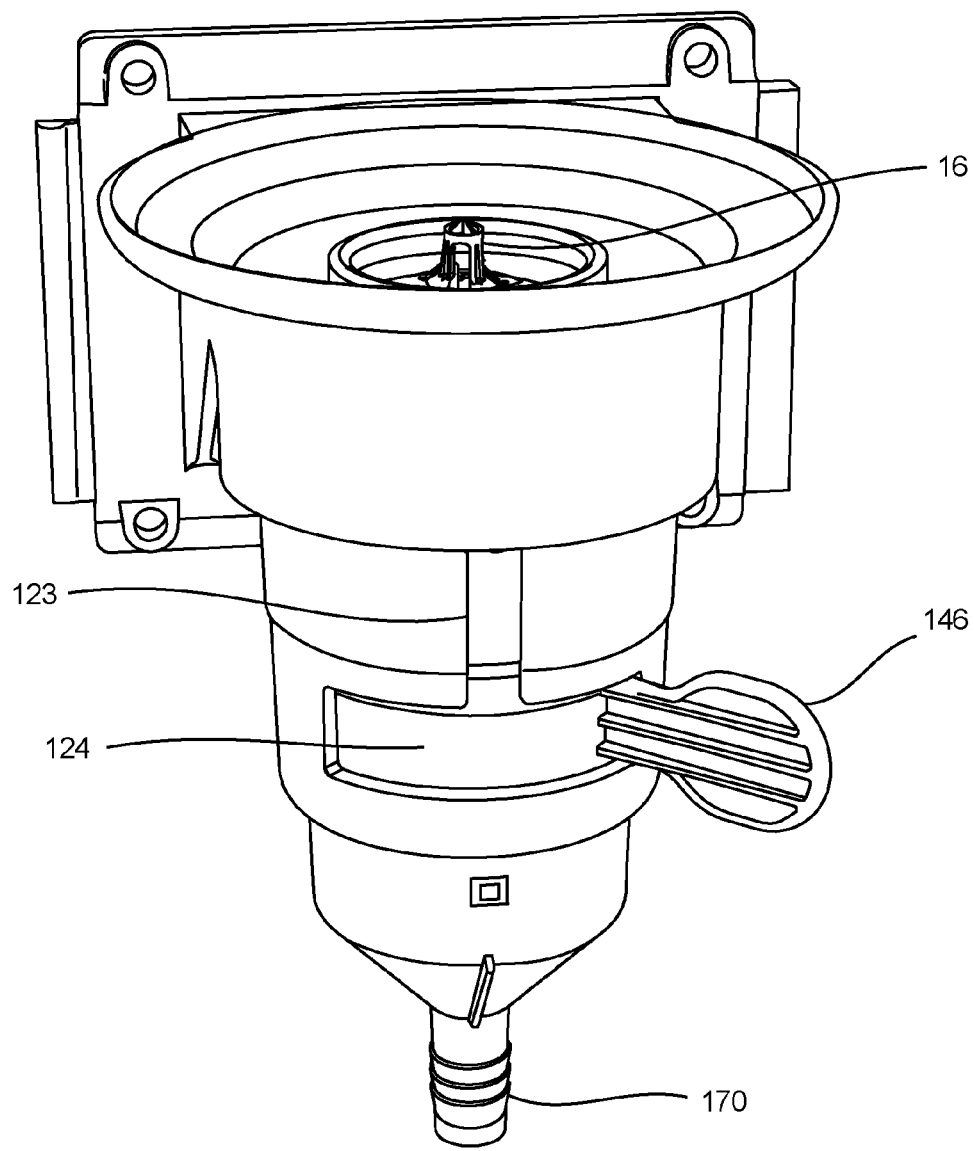
FIG. 29 is a front perspective view of the assembled dosing device of the present invention.
Figure 30:
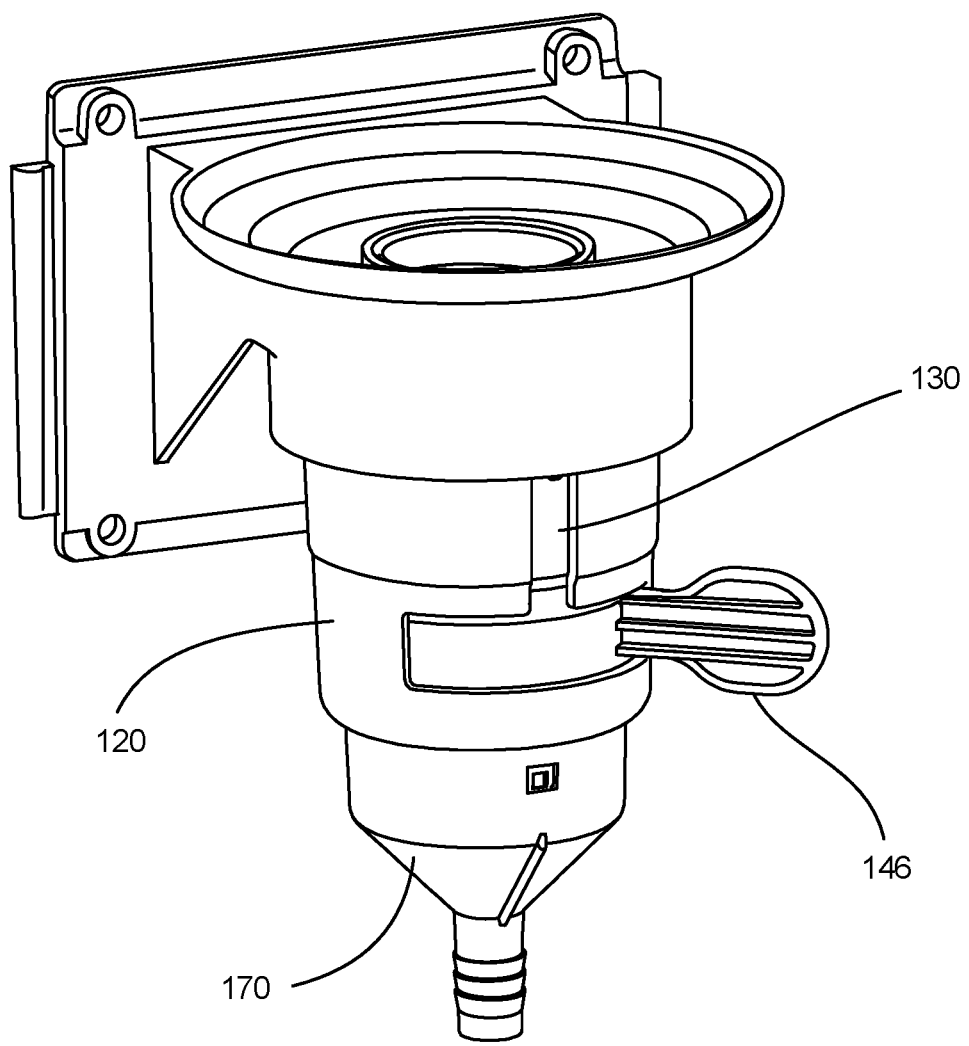
FIG. 30 is another side perspective view of the assembled dosing device of the present invention.
Figure 31:
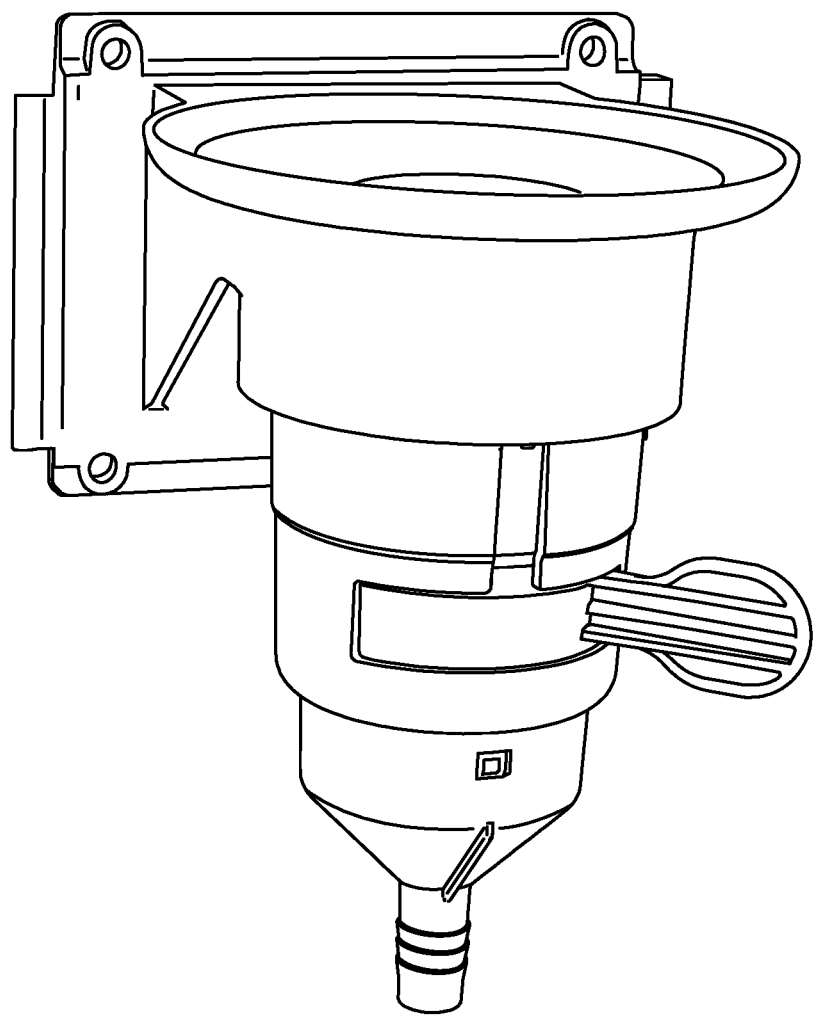
FIG. 31 is a front view of the assembled dosing device of the present invention
Figure 32:
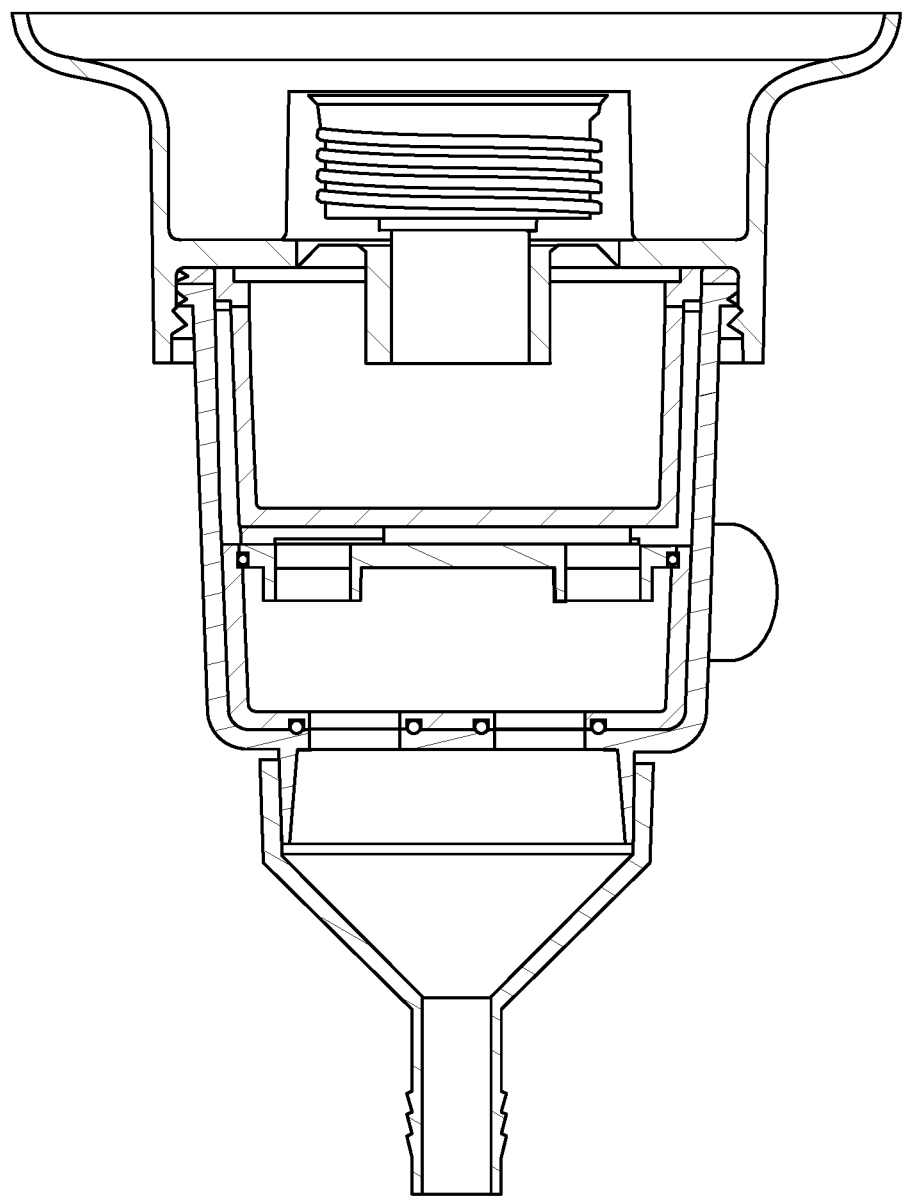
FIG. 32 is a sectional view of the dosing device taken along line A-A.
Figure 33A:
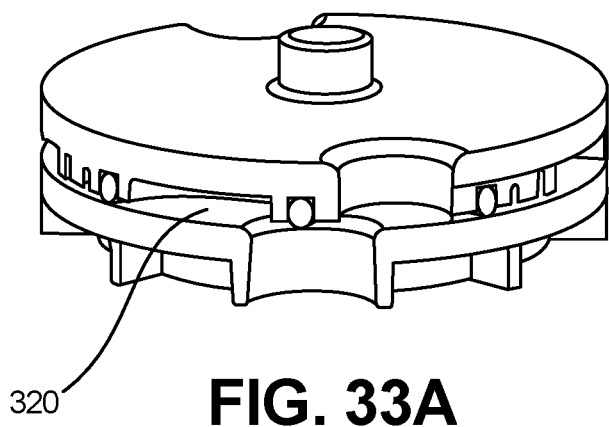
FIG. 33A is a cutaway of the bottom of the reservoir and top of the dosing cup with the reservoir outlet ports partially aligned with the cap inlet ports.
Figure 33B:
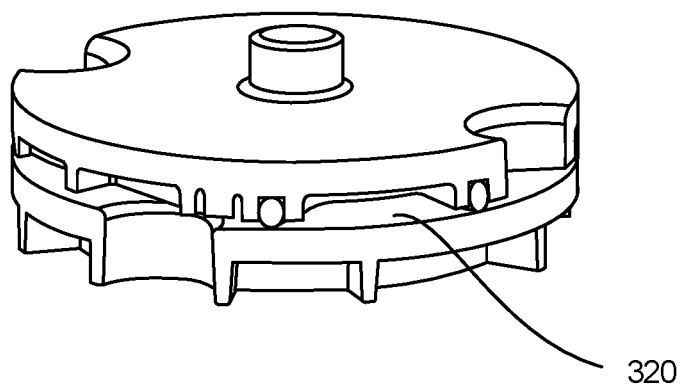
FIG. 33B is a cutaway of the bottom of the reservoir and top of the dosing cup with the reservoir outlet ports aligned with the blocking region of the cap.

As fluid exits the dosing cup, air is drawn through the valve housing as shown in FIG. 24. Because the cap inlet ports are no longer aligned with the reservoir outlets or the reservoir seals, and the reservoir base is spaced from the top surface of the cap as shown in FIGS. 33A and 33B, air is able to enter the dosing cup, expediting the flow of liquid from the dosing cup, out of the valve housing.

Rotating the dosing cup back to the fill position permits the dosing cup to be refilled.

The benefits of Applicant's arcuate seals on the bottom of the reservoir are best understood by reference to FIGS. 25A-25D. As shown, the seals include a first circular portion 300 (FIG. 12A) that is concentric with the reservoir outlet (or other shape dependent on the shape of the outlet port). A second portion 310 is an arcuate extension off the first portion of the seal. This section of the seal will prevent leakage of liquid that would otherwise occur in the absence of the second portion of the seal.

Referring to FIG. 25A, when the dosing cup is in the "Fill" position, liquid in the reservoir can enter the dosing cup through the aligned reservoir outlet ports and the cap/dosing cup inlet ports. As the dosing cup is rotated to the position shown in FIG. 25B, the reservoir outlet port is no longer aligned with the cap inlet port. Given the spatial separation between the bottom of the reservoir and the top of the cap, liquid would leak from this area without the second portion of the seal. However, the second portion of the seal maintains the seal between the reservoir and the cap during this transition from Fill to Dose position, preventing leakage. A recess 320 in the bottom of the reservoir, above the second portion of the seal (FIGS. 33A and 33B), provides space to trap what little liquid that might have escaped the reservoir during the transition from Fill to Dose positions. These same Figures also illustrate how air is allowed to enter the dosing cup to facilitate release of the liquid from the dosing cup.

Figure 34:
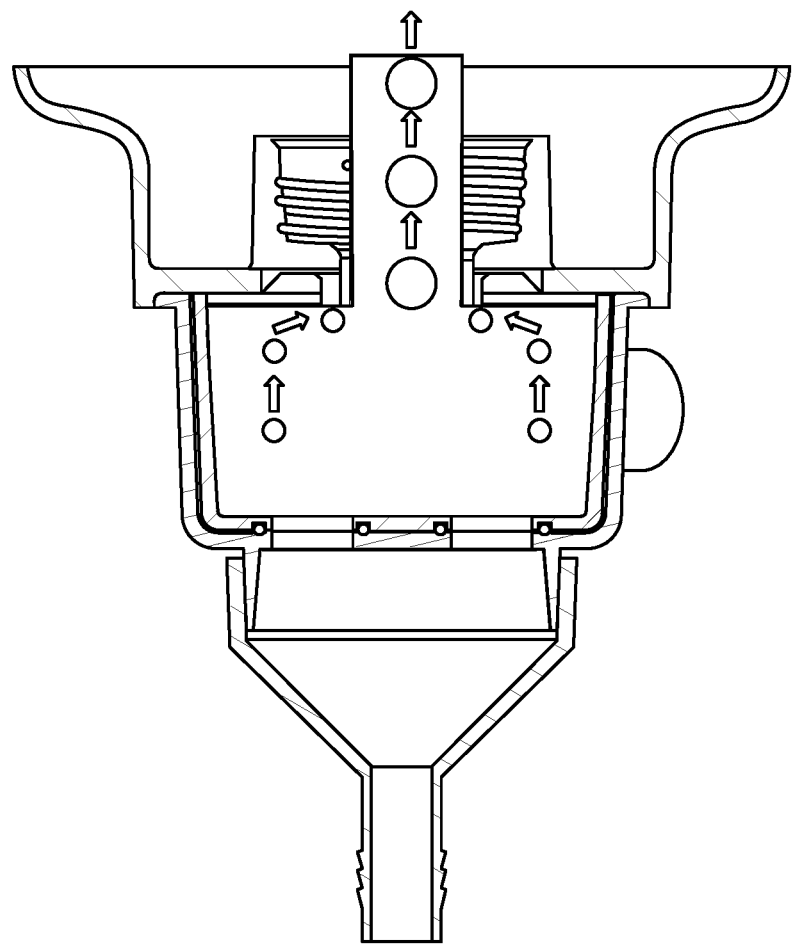
FIG. 34 is a sectional view of an alternate embodiment of the dosing device when the dosing cup is in the fill position.
Figure 35:
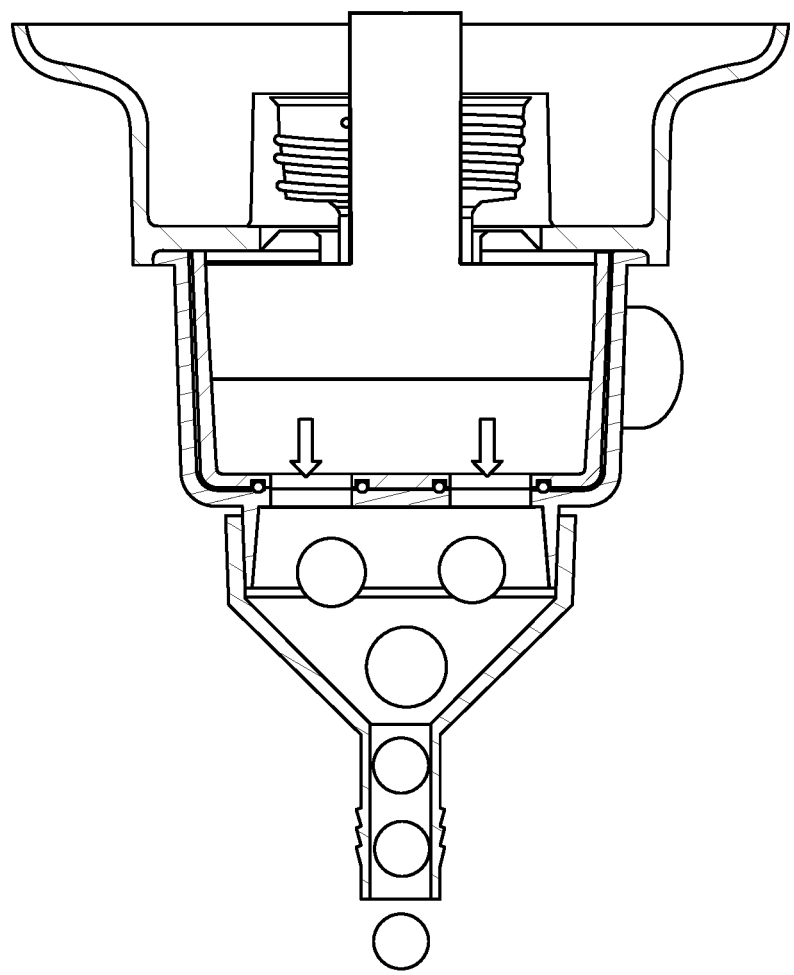
FIG. 35 is a sectional view of an alternate embodiment of the dosing device of FIG. 34 when the dosing cup is in the dose position.

In another preferred embodiment, shown in FIGS. 34 and 35, the reservoir can be incorporated into the dispenser base.

In another embodiment, rather than using a rotatable dosing cup to align the inlet and outlet ports of the components of the dosing device, a linearly movable dosing cup can be utilized. Other shapes of the cup are also therefore possible.

In another preferred embodiment, the cap can be glued or welded to the dosing cup (dependent on material) to eliminate the need for an O ring seal.

In another preferred embodiment, the cap can be stainless steel or other materials that create less friction when the dosing cup is rotated and provide greater wear over time.

In another embodiment, the dosing device can be horizontally mounted.

In this manner, the valve assembly of Anderson Chemical's chemical dosing device provides an effective means for delivering a measured dose of the chemical from the container to the funnel and the ultimate destination point.

What is claimed is:

1. A liquid dosing device for use with a liquid dispenser including a container for holding liquid in fluid communication with a dispenser base having an outlet port for dispensing the liquid in the container, the liquid dosing device including:

a. a valve housing mounted to the dispenser base, the valve housing including an open top, an outlet port and a blocking region;
   b. a reservoir mounted within the valve housing, the reservoir having at least one inlet port in fluid communication with the dispenser base outlet port and at least one outlet port;
   c. a dosing cup movably mounted within the valve housing in fluid communication with the reservoir, the dosing cup having at least one inlet port in fluid communication with the reservoir outlet port, a blocking region, at least one outlet port and means for moving the dosing cup between a fill position to receive the liquid and a dose position to dispense the liquid; and
   d. wherein, when the dosing cup is moved to the fill position, the reservoir outlet port and the dosing cup inlet port align to permit the liquid to flow from the reservoir into the dosing cup and the outlet port of the dosing cup and the blocking region of the valve housing align to prevent the liquid in the dosing cup from flowing out of the dosing cup, and when the dosing cup is moved to the dose position, the reservoir outlet port and the dosing cup blocking region align to prevent the liquid from flowing from the reservoir into the dosing cup and the outlet port of the dosing cup and the outlet port of the valve housing align to permit the liquid in the dosing cup to flow out of the dosing cup and valve housing.

2. The liquid dosing device of claim 1 wherein the reservoir further comprises a seal having a first portion that encircles the reservoir outlet and a second portion that is an extension of the first portion of the seal, such that as the dosing cup transitions from the fill position to the dose position, the second portion of the seal seals off the reservoir outlet to prevent leakage of the liquid therefrom.

3. The liquid dosing device of claim 1 wherein the dosing cup further includes a seal that encircles the dosing cup outlet, such that as the dosing cup transitions from the fill position to the dose position, the outlet engages the blocking region of the valve housing to prevent leakage of the liquid therefrom.

4. The liquid dosing device of claim 1 wherein a bottom of the reservoir and a top of the dosing cup are in spatial relation, and wherein there is a seal located on the bottom of the reservoir that engages a top surface of the dosing cup, such that when the dosing cup is in the fill position, the seal prevents leakage of the liquid between the reservoir and the dosing cup and when the dosing cup is in the dose position, there is no seal between the dosing cup inlet and the bottom of the reservoir, allowing air to enter the dosing cup through the dosing cup inlet.

5. The liquid dosing device of claim 1, further including a spacer mounted in the dosing cup for limiting the volume of a liquid that can be contained in the dosing cup.

6. The dosing device of claim 1 wherein the reservoir includes a seal having a first portion that encircles the reservoir outlet and an adjoining second portion, such that as the dosing cup transitions from the fill position to the dose position, the second portion of the seal engages the dosing cup cap to seal off the reservoir outlet and prevent leakage of the liquid from the reservoir outlet; the dosing cup includes a seal that encircles the dosing cup outlet, such that as the dosing cup transitions from the fill position to the dose position, the outlet seal engages a blocking region of the valve housing to prevent leakage of the liquid from the dosing cup outlet; a seal is mounted to a bottom of the cap or a top rim of the dosing cup to seal a connection between the cap and dosing cup and prevent the liquid from leaking out between the top of the dosing cup and the cap; and spacers are defined on a bottom surface of each of the reservoir, cap and dosing cup to limit the compression on the seals.

7. The dosing device of claim 1 wherein the dosing cup or the valve housing are color coded to indicate a volumetric capacity of the dosing cup.

8. The dosing device of claim 1 wherein the reservoir, dosing cup and valve housing each contain two outlet ports.

9. The dosing device of claim 1 wherein the valve housing further includes an elongated slot transverse to a horizontal elongated slot for mounting the dosing cup within the valve housing.

10. The dosing device of claim 1 wherein the reservoir further comprises a seal having a first portion that encircles the reservoir outlet and a second portion that is an extension of the first portion of the seal, such that as the dosing cup transitions from the fill position to the dose position, the second portion of the seal seals off the reservoir outlet to prevent leakage of the liquid therefrom and the seal is made of fluoroelastomers with a 70 Shore A durometer hardness.

11. A liquid dosing device for use with a liquid dispenser including a container for holding liquid in fluid communication with a dispenser base having a liquid reservoir with at least one outlet port, the liquid dosing device including:
　a. a valve housing mounted to the dispenser base, the valve housing including an open top, an outlet port and a blocking region;
　b. a dosing cup movably mounted within the valve housing in fluid communication with the reservoir, the dosing cup having at least one inlet port in fluid communication with the reservoir outlet port, a blocking region, at least one outlet port and means for moving the dosing cup between a fill position to receive the liquid and a dose position to dispense the liquid; and
　c. wherein, when the dosing cup is moved to the fill position, the reservoir outlet port and the dosing cup inlet port align to permit the liquid to flow from the reservoir into the dosing cup and the outlet port of the dosing cup and the blocking region of the valve housing align to prevent the liquid in the dosing cup from flowing out of the dosing cup, and when the dosing cup is moved to the dose position, the reservoir outlet port and the dosing cup blocking region align to prevent the liquid from flowing from the reservoir into the dosing cup and the outlet port of the dosing cup and the outlet port of the valve housing align to permit the liquid in the dosing cup to flow out of the dosing cup and valve housing.

12. The liquid dosing device of claim 11 wherein the reservoir further comprises a seal having a first portion that encircles the reservoir outlet and a second portion that is an extension of the first portion of the seal, such that as the dosing cup transitions from the fill position to the dose position, the second portion of the seal seals off the reservoir outlet to prevent leakage of the liquid therefrom.

13. The liquid dosing device of claim 11 wherein the dosing cup further includes a seal that encircles the dosing cup outlet, such that as the dosing cup transitions from the fill position to the dose position, the outlet engages the blocking region of the valve housing to prevent leakage of the liquid therefrom.

14. A liquid dosing device for use with a liquid dispenser including a container for holding liquid and a base, the container having an opening to permit the liquid to flow out of the container, the base having an inlet port, outlet port and means for engaging the container to permit the liquid in the container to flow through the base inlet and outlet ports, the liquid dosing device including:
　a. a valve housing mounted to a bottom of the dispenser base, the valve housing including an open top, an elongated slot in a side of the valve housing, an outlet port and a blocking region;
　b. a reservoir mounted to the bottom of the dispenser base, within the valve housing, the reservoir having an open top and at least one outlet port;
　c. a dosing cup rotatably mounted within the valve housing below the reservoir outlet port, the dosing cup having an open top, at least one outlet port and a dosing lever attached to a side of the dosing cup, the dosing lever of the dosing cup extending through the elongated slot in the side of the valve housing for rotating the dosing cup between a fill position to receive the liquid and an empty position to drain the liquid from the dosing cup;
　d. a cap mounted over the open top of the dosing cup, below the reservoir, the cap having at least one inlet port and a blocking region;
　e. wherein, when the dosing cup is rotated to the fill position, the reservoir outlet port and the cap inlet port align to permit the liquid to flow from the reservoir into the dosing cup, while the outlet port of the dosing cup is aligned with the blocking region of the valve housing to prevent the liquid in the dosing cup from flowing out of the dosing cup, and when the dosing cup is rotated to the empty position, the reservoir outlet port is aligned with the cap blocking region to prevent the liquid from flowing from the reservoir into the dosing cup, while the outlet port of the dosing cup and the outlet port of the valve housing are aligned to permit the liquid in the dosing cup to flowing out of the dosing cup and valve housing.

15. The dosing device of claim 14 wherein the reservoir includes a seal having a first portion that encircles the reservoir outlet and an adjoining second portion, such that as the dosing cup transitions from the fill position to the dose position, the second portion of the seal engages the dosing cup cap to seal off the reservoir outlet and prevent leakage of the liquid from the reservoir outlet; wherein the dosing cup includes a seal that encircles the dosing cup outlet, such that as the dosing cup transitions from the fill position to the dose position, the outlet seal engages a blocking region of the valve housing to prevent leakage of the liquid from the dosing cup outlet; and a seal is mounted to a bottom of the cap or a top rim of the dosing cup to seal a connection between the cap and dosing cup and prevent the liquid from leaking out between the top of the dosing cup and the cap.

16. The dosing device of claim 14 wherein the valve housing includes a protrusion extending upward from a top surface of a bottom of the valve housing for supporting the dosing cup; the dosing cup includes a protrusion extending upward from a top surface of a bottom of the dosing cup to support the cap and the cap includes a protrusion extending upward from a top surface of the cap for supporting the reservoir.

17. The dosing device of claim 14 wherein at a top of the dosing cup is an upwardly extending tab for engaging a notch defined in the cap to keep the cap from rotating on the dosing cup.

18. A liquid dosing device for use with a liquid dispenser including a container for holding liquid and a base, the container having a threaded neck defining a throat to permit the liquid to flow out of the container and a valve having an open and a closed position, mounted within the throat of the container neck to control the flow of the liquid from the container, the base having a threaded inlet port for engaging the neck of the container, a probe for engaging the container valve to cause it to move to the open position, and an outlet port, the liquid dosing device including:
  a. a valve housing mounted to a bottom of the dispenser base, the valve housing including an open top, an elongated slot in a side of the valve housing, an outlet port and a blocking region;
  b. a reservoir mounted to the bottom of the dispenser base, within the valve housing, the reservoir having at least one inlet port and at least one outlet port, a dosing cup rotatably mounted within the valve housing below the reservoir outlet port, the dosing cup having an open top, at least one outlet port and a dosing lever attached to a side of the dosing cup, the dosing lever of the dosing cup extending through the elongated slot in the side of the valve housing for rotating the dosing cup between a fill position to receive the liquid and an empty position to drain the liquid from the dosing cup;
  c. a cap mounted over the open top of the dosing cup, the cap having at least one inlet port and a blocking region;
  d. wherein, when the dosing cup is rotated to the fill position, the reservoir outlet port and the cap inlet port align to permit the liquid to flow from the reservoir into the dosing cup, while the outlet port of the dosing cup is aligned with the blocking region of the valve housing to prevent the liquid in the dosing cup from flowing out of the dosing cup, and when the dosing cup is rotated to the empty position, the reservoir outlet port is aligned with the cap blocking region to prevent the liquid from flowing from the reservoir into the dosing cup, while the outlet port of the dosing cup and the outlet port of the valve housing are aligned to permit the liquid in the dosing cup to flowing out of the dosing cup and valve housing.

\* \* \* \* \*